United States Patent [19]

McCombie

[11] Patent Number: 4,860,210

[45] Date of Patent: Aug. 22, 1989

[54] METHOD OF DETERMINING AND USING A FILTERED SPEED ERROR IN AN INTEGRATED ACCELERATION BASED ELECTRONIC SPEED CONTROL SYSTEM FOR VEHICLES

[75] Inventor: Jay C. McCombie, West Bloomfield, Mich.

[73] Assignee: Chrysler Motors Corporation, Highland Park, Mich.

[21] Appl. No.: 23,165

[22] Filed: Mar. 6, 1987

[51] Int. Cl.⁴ .................. G06G 7/70; B60K 31/00
[52] U.S. Cl. .................. 364/426.04; 180/176; 180/179; 123/352; 324/160
[58] Field of Search .......... 364/424, 431.07, 426.04, 364/565; 180/170, 171, 174, 176, 178, 177, 179; 324/160, 161, 162; 123/352; 74/866

[56] References Cited

U.S. PATENT DOCUMENTS

| | | | |
|---|---|---|---|
| 3,722,614 | 3/1973 | Sakakibara et al. | 180/176 |
| 3,941,202 | 3/1976 | Sorkin | 364/900 |
| 4,066,874 | 1/1978 | Shaw | 180/179 |
| 4,066,876 | 1/1978 | Shaw et al. | 180/179 |
| 4,138,723 | 2/1979 | Nehmer et al. | 364/565 |
| 4,219,706 | 8/1980 | Koch | 200/4 |
| 4,250,854 | 2/1981 | Matsui et al. | 123/352 |
| 4,335,689 | 6/1982 | Abe | 123/339 |
| 4,335,799 | 6/1982 | Shields | 180/175 |
| 4,336,566 | 6/1982 | Noddings et al. | 180/178 |
| 4,340,824 | 7/1982 | Shaw | 307/115 |
| 4,345,663 | 8/1982 | Shields | 180/177 |
| 4,352,403 | 10/1982 | Burney | 180/176 |
| 4,394,739 | 7/1983 | Suzuki et al. | 364/426 |
| 4,419,729 | 12/1983 | Krieder | 123/352 |
| 4,431,077 | 2/1984 | Burney | 180/176 |
| 4,451,888 | 5/1984 | Kuno et al. | 364/426 |
| 4,451,890 | 5/1984 | Suzuki et al. | 364/426 |
| 4,463,822 | 8/1984 | Tanigawa et al. | 180/177 |
| 4,467,428 | 8/1984 | Caldwell | 364/426 |
| 4,470,478 | 9/1984 | Hayashi et al. | 180/176 |
| 4,472,777 | 9/1984 | Youngblood | 364/426 |
| 4,478,184 | 10/1984 | Shinoda et al. | 123/352 |
| 4,479,184 | 10/1984 | Nakano | 364/426 |
| 4,484,279 | 11/1984 | Muto | 364/426 |
| 4,488,527 | 12/1984 | Pfalzgraf et al. | 123/399 |
| 4,492,211 | 1/1985 | Shimomura | 123/585 |
| 4,501,284 | 2/1985 | Kuno et al. | 123/352 |
| 4,508,078 | 4/1985 | Takeuchi | 123/339 |
| 4,516,652 | 5/1985 | Tanigawa et al. | 180/177 |
| 4,522,280 | 6/1985 | Blaney | 180/175 |
| 4,537,272 | 8/1985 | Tanigawa et al. | 123/352 |
| 4,549,266 | 10/1985 | Schneider et al. | 364/426 |
| 4,553,621 | 11/1985 | Hyodo et al. | 123/352 |
| 4,597,465 | 7/1986 | Burney | 180/176 |
| 4,606,425 | 8/1986 | Hayashi et al. | 180/177 |
| 4,608,954 | 9/1986 | Gray | 123/352 |
| 4,612,638 | 9/1986 | Kissel | 371/15 |
| 4,622,636 | 11/1986 | Tachibana | 364/404 |
| 4,637,361 | 1/1987 | Killen et al. | 123/339 |
| 4,646,861 | 3/1987 | Kawata et al. | 180/179 |
| 4,707,792 | 11/1987 | Naitou | 180/176 X |
| 4,718,012 | 1/1988 | Oshiage | 364/161 X |
| 4,725,969 | 2/1988 | Onogi et al. | 180/179 X |
| 4,739,485 | 4/1988 | Hayashi | 364/431.07 |

OTHER PUBLICATIONS

SAE Paper No. 830662, by Peter G. Blaney entitled "Improvement to Cruise Controls Utilizing Microprocessor Technology", presented at the International Congress and Exposition in Detroit, Michigan, Feb. 28–Mar. 4, 1983.

Paper entitled "New LSI Circuits that Optimize Cruise Control Systems", by Mark L. Shaw, presented at the INTERNEPCON 1978 Conference.

Chapter entitled "Vehicle Motion Control", pp. 209-230, of Book by Ribbens and Mansour entitled *Understanding Automotive Electronics* published by Texas Instruments and distributed by the Society of Automotive Engineers (SAE).

*Primary Examiner*—Parshotam S. Lall
*Assistant Examiner*—Ellis B. Ramirez
*Attorney, Agent, or Firm*—Mark P. Calcaterra

[57] ABSTRACT

Speed error is calculated by finding the difference between set speed and vehicle speed and then filtering the result. The error is tested for polarity and magnitude before selecting a desired acceleration rate. This acceleration rate is used in an acceleration based electronic speed control system for vehicles.

3 Claims, 13 Drawing Sheets

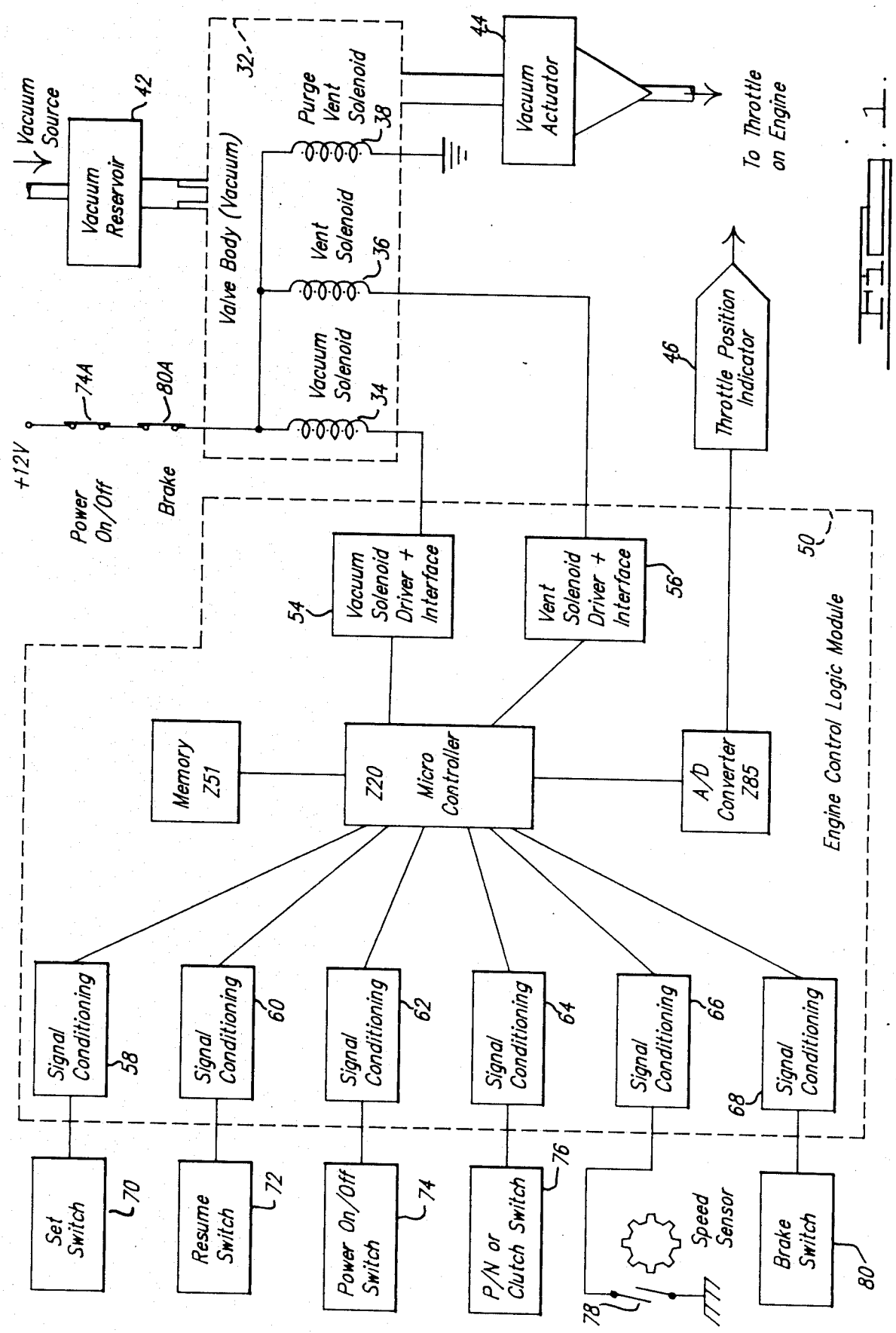

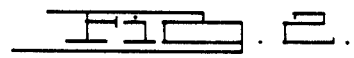
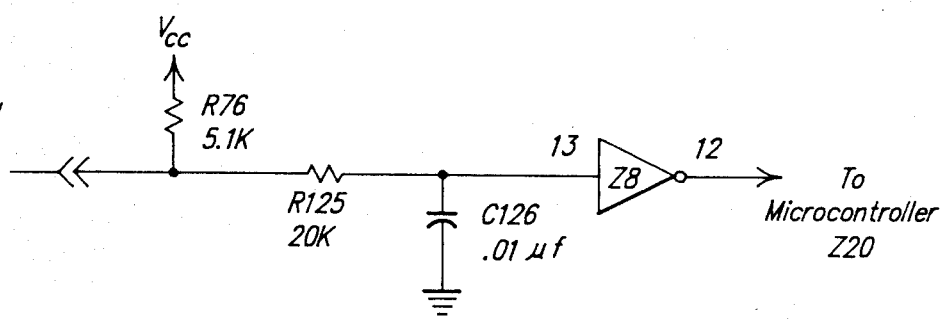
FIG. 3.
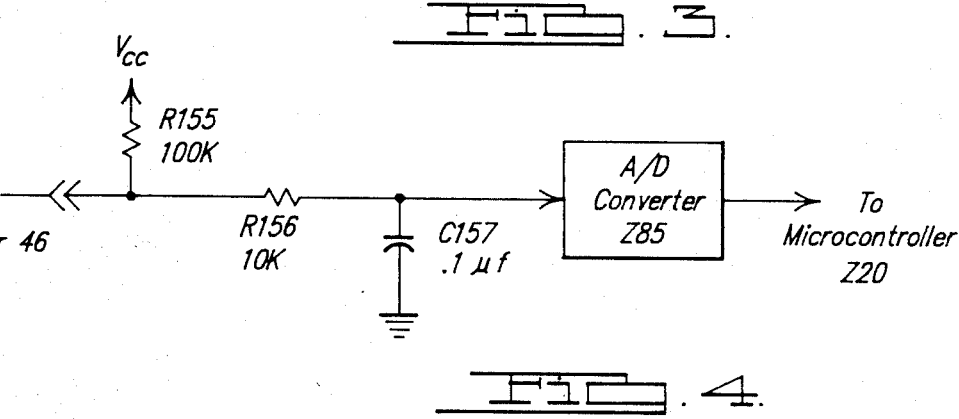
FIG. 4.
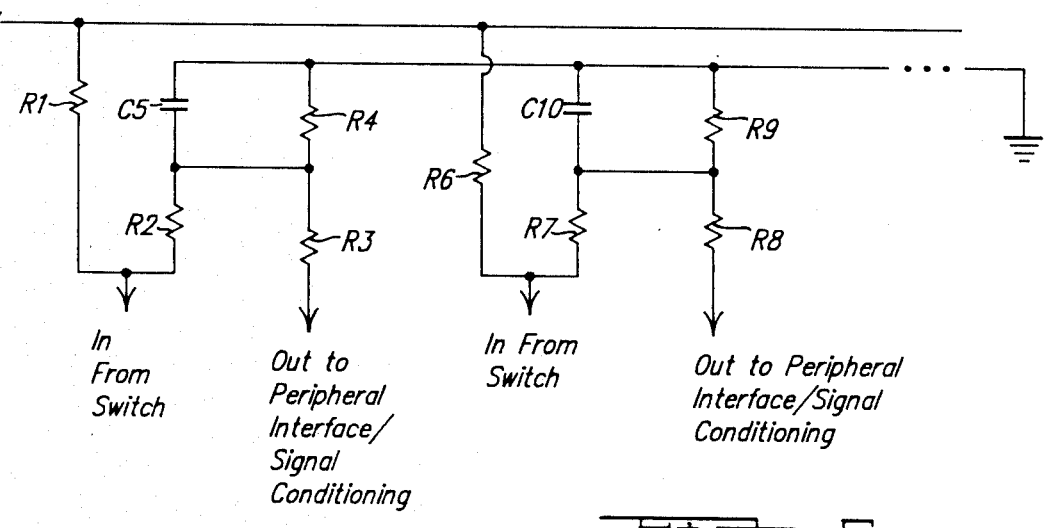
FIG. 5.

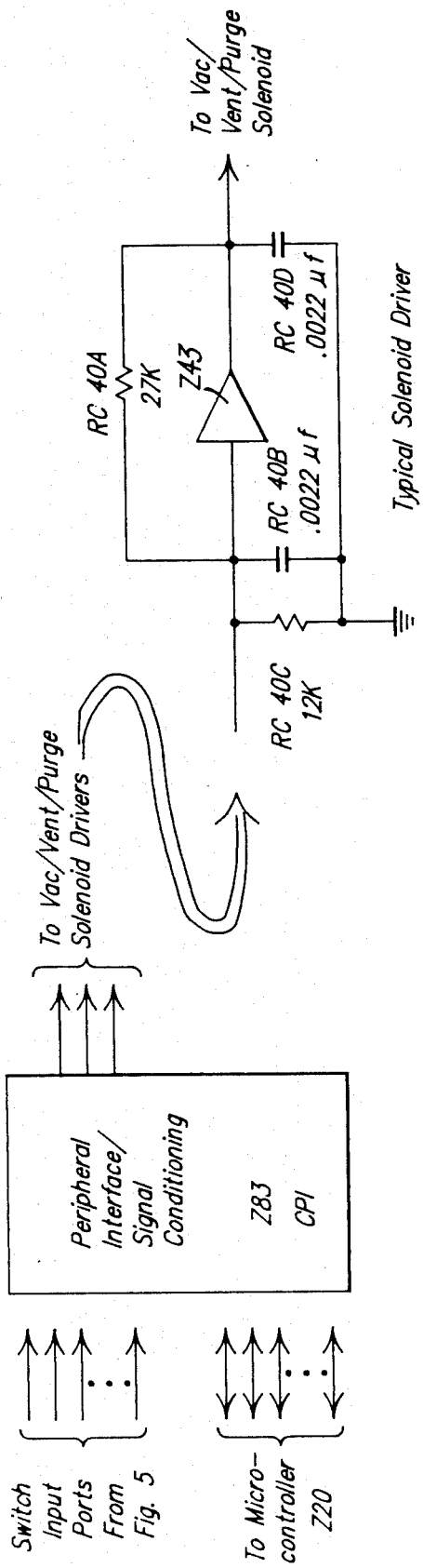
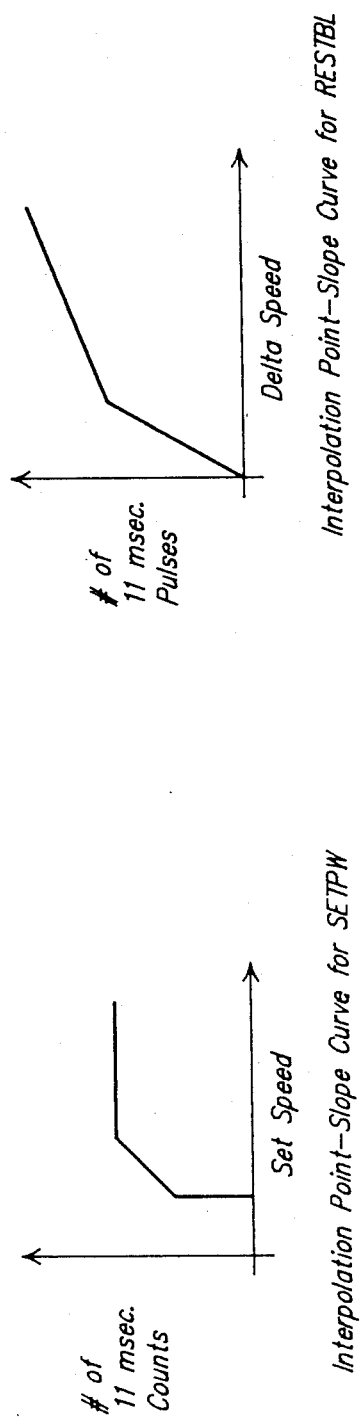
FIG. 13.
FIG. 14.
FIG. 15.

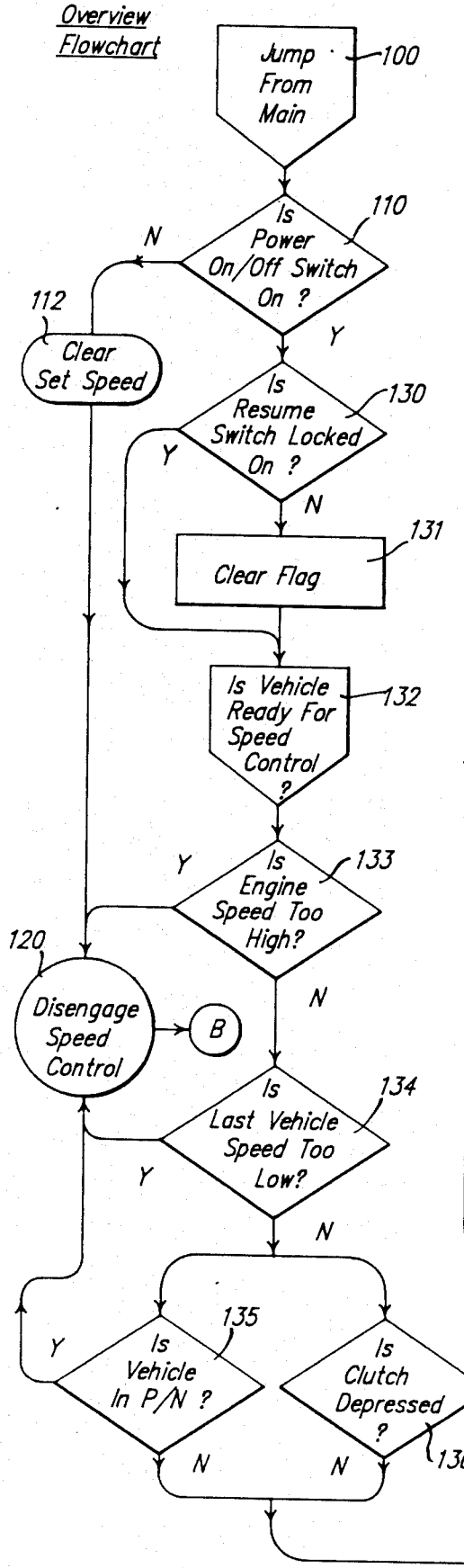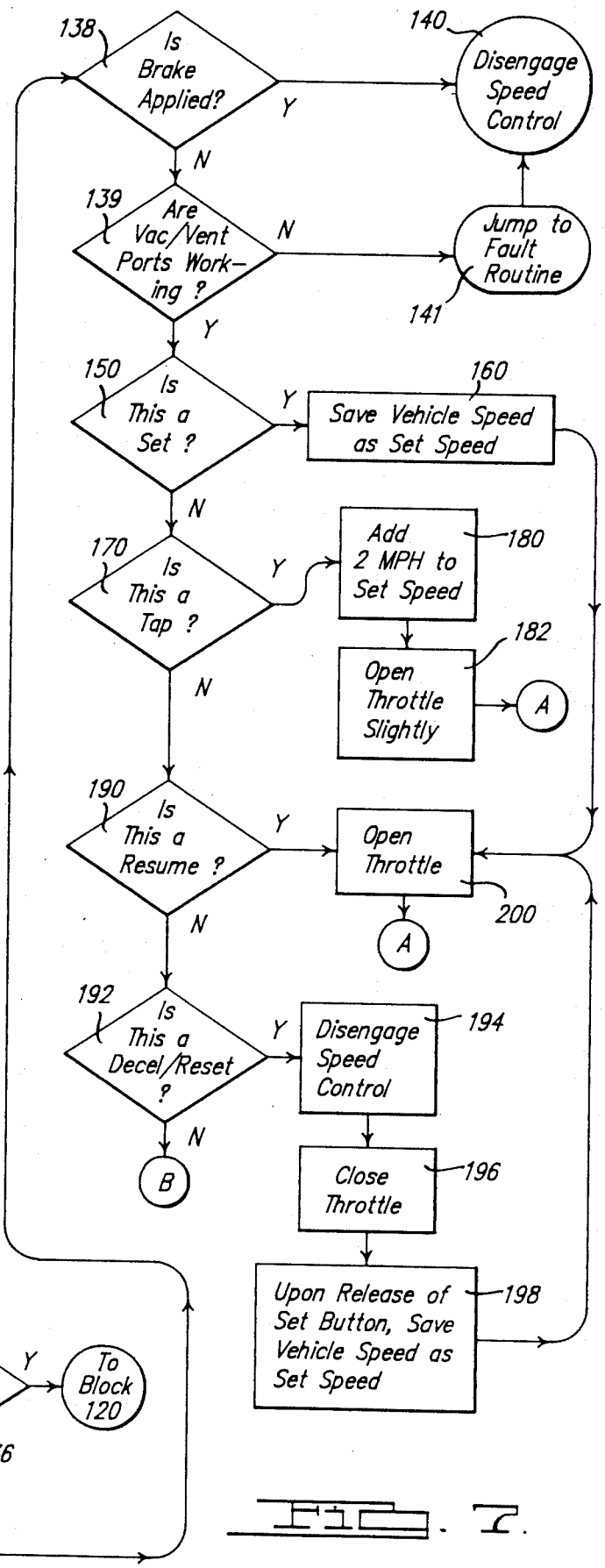
FIG. 7.

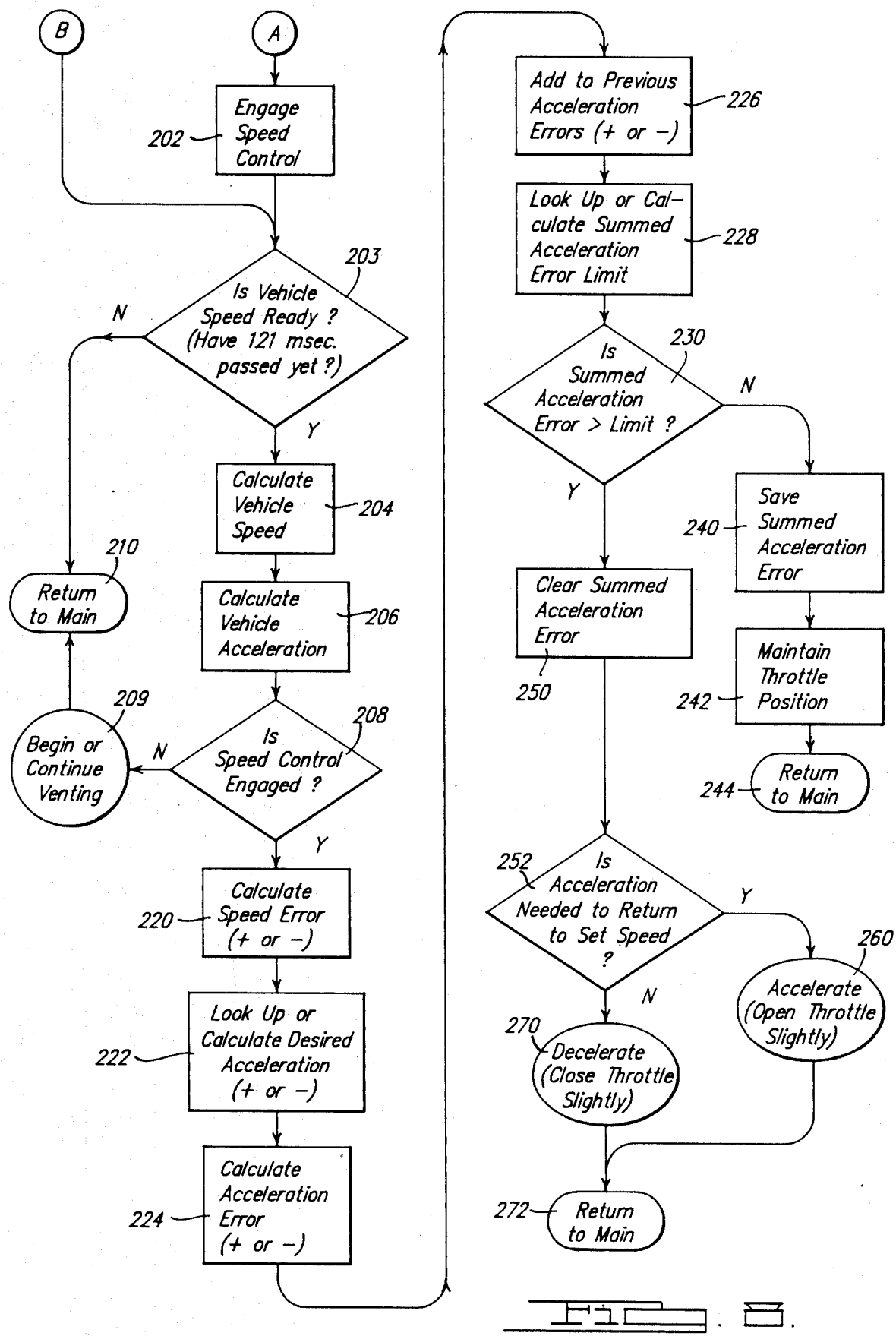

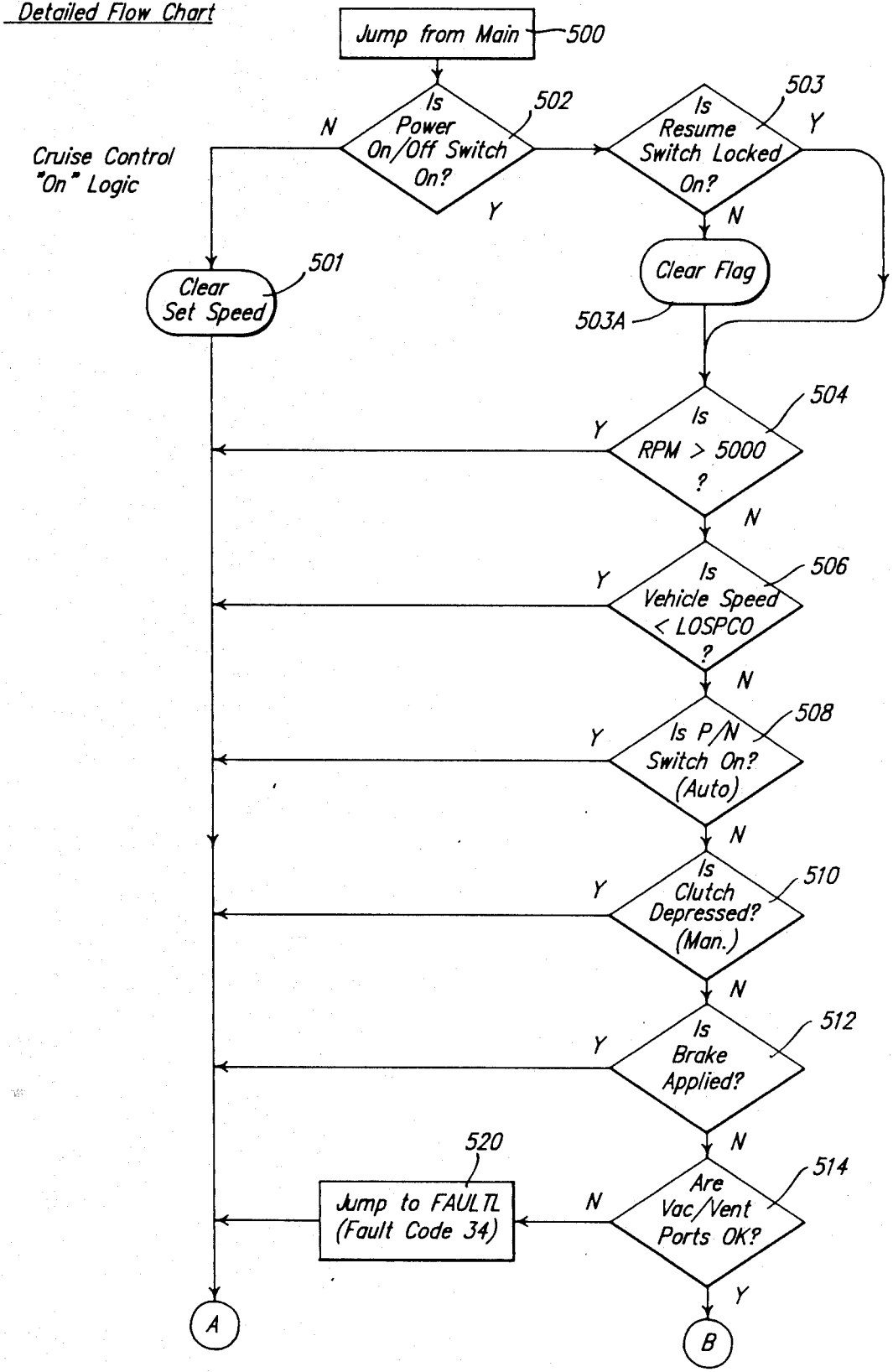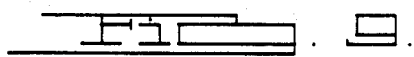

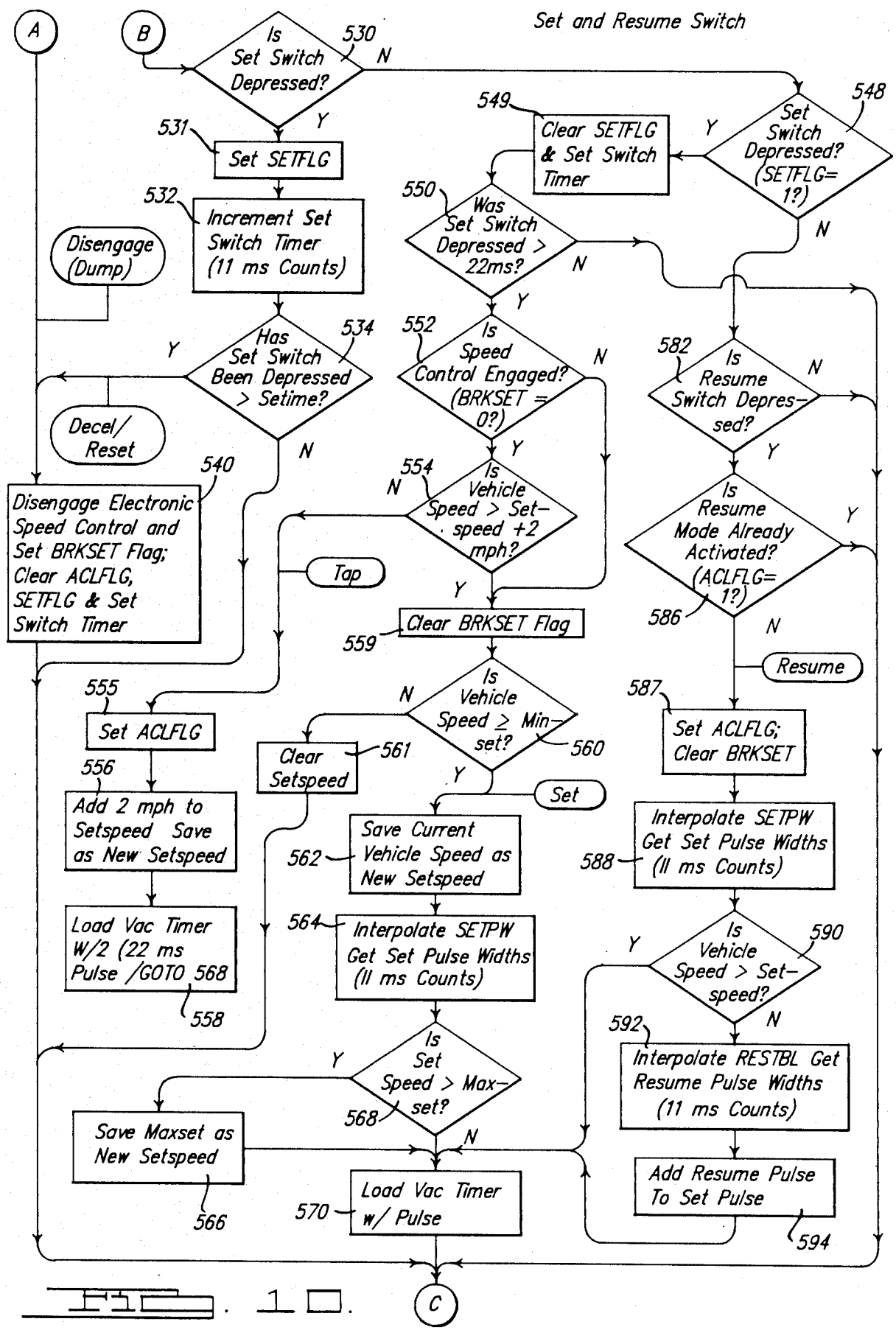

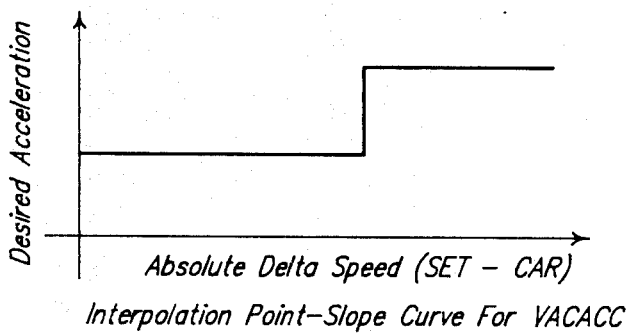
Interpolation Point-Slope Curve For VACACC
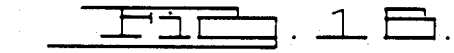
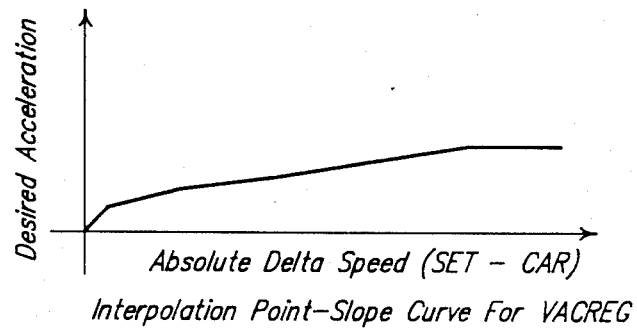
Interpolation Point-Slope Curve For VACREG
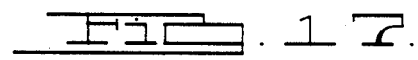
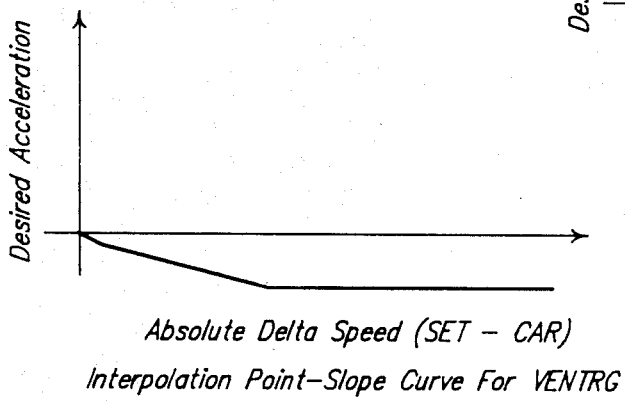
Interpolation Point-Slope Curve For VENTRG
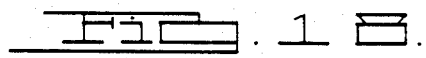
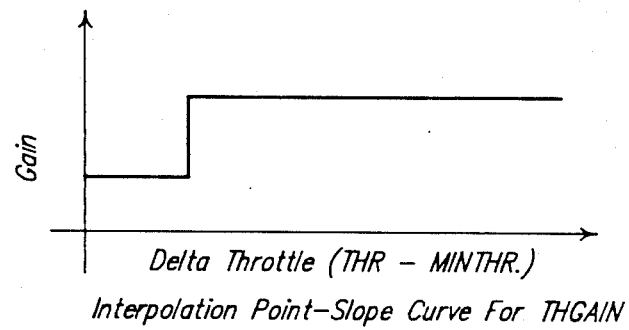
Interpolation Point-Slope Curve For THGAIN
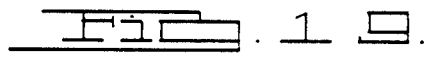
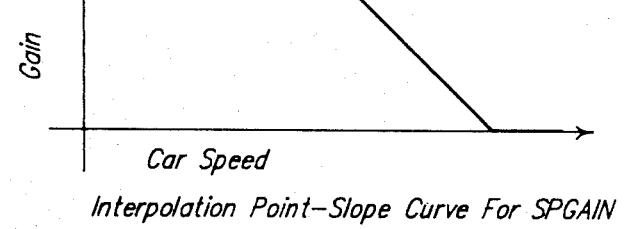
Interpolation Point-Slope Curve For SPGAIN
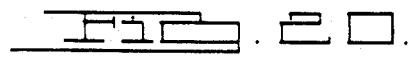

METHOD OF DETERMINING AND USING A FILTERED SPEED ERROR IN AN INTEGRATED ACCELERATION BASED ELECTRONIC SPEED CONTROL SYSTEM FOR VEHICLES

BACKGROUND OF THE INVENTION

1. Field of the Invention

The subject invention relates to speed or "cruise" control systems for automobiles. More specifically, it relates to an electronically controlled speed control system utilizing methods of control in a microcomputer circuit.

2. Description of the Related Art

U.S. Pat. No. 3,722,614 issued on Mar. 27, 1973 to Sakakibara et al., "Method And Apparatus For Causing Constant Traveling Speed Of Automotive Vehicles," discloses an early version of electronic speed control utilizing servo motors and sensing the traveling speed of a vehicle with a pulse width.

U.S. Pat. No. 4,066,874 issued on Jan. 3, 1978, to Mark L. Shaw, "Digital Speed Control System," discloses a logic circuit for use in a velocity control system. This patent describes a discrete digital system for controlling speed and acceleration and digital means to calculate acceleration.

Also issued on Jan. 3, 1978 is U.S. Pat. No. 4,066,876 to Mark L. Shaw et al., "Digital Speed Control System," which also discloses a discrete digital logic velocity control system.

U.S. Pat. No. 4,250,854 issued on Feb. 17, 1981 to Matsui et al., "Speed Control System For Automotive Vehicles," discloses a speed difference calculation circuit which is provided to calculate a first time difference between a predetermined period of time corresponding with the desired vehicle speed and the actual period of time corresponding with the actual vehicle speed, along with an acceleration calculation circuit. A correlation signal is obtained dependent on each value of two calculated time differences to control the quantity of fuel supplied into the engine so as to maintain the speed of the vehicle as the desired value.

U.S. Pat. No. 4,335,799 issued on June 22, 1982 to Neal G. Shields, "Speed Governor With Below Dashboard Servomotor," deals with the interior mounting of a vacuum servo so that installation is less sensitive to vehicle design.

U.S. Pat. No. 4,340,824 issued on July 20, 1982 to Mark L. Shaw, "Auxiliary Steering Wheel Command System," deals with a multiplexing data switch selection through the steering column, including those used for speed control.

U.S. Pat. No. 4,345,663 issued on Aug. 24, 1982 to Neal G. Shields, "Speed Governor With Dual Safety System," deals with the safety dump valve being independent of a control circuit or a control break switch.

U.S. Pat. No. 4,352,403 issued on Oct. 5, 1982 to Charles F. Burney, "Vehicle Speed Control System," discloses a system which decreases the amount of acceleration given the vehicle as the desired speed is approached in order to assure a smooth, positive transition to desired speed. This is done with discrete electronic componentry.

U.S. Pat. No. 4,394,739 issued on July 19, 1983 to Suzuki et al., "Automatic Speed Control For An Automotive Vehicle," discloses a circuit and method to deal with a stuck resume button in an analog circuit speed control system.

U.S. Pat. No. 4,431,077 issued on Feb. 14, 1984, to Charles F. Burney, "Vehicle Speed Control System," is related to U.S. Pat. No. 4,352,403 previously described. It discloses a throttle feedback/speed error control system with a potentiometer set for the desired speed. It involves the use of analog and discrete digital components.

U.S. Pat. No. 4,451,888 issued on May 29, 1984 to Kuno et al., "Speed Control Method And Apparatus For Automotive Vehicles," discloses an electronic circuit and method for vehicle speed control which appears to utilize discrete electronic componentry.

U.S. Pat. No. 4,451,890 issued on May 29, 1984, to Suzuki et al., "Automatic Speed Control System For An Automotive Vehicle," provides a means of responding to a stuck resume button in an analog circuit for speed control and is related to U.S. Pat. No. 4,394,739 which is described above.

U.S. Pat. No. 4,463,822 issued on Aug. 7, 1984, to Tanigawa et al., "Cruise Control System For Automotive Vehicle," discloses an overdrive controller in combination with a cruise control system which will automatically shift the transmission of the vehicle in and out of overdrive in response and in conjunction with the controlling of the speed by the electronic cruise control system.

U.S. Pat. No. 4,467,428 issued on Aug. 21, 1984, to Caldwell, "Automatic Speed Control Systems," discloses a speed control system mainly for heavy duty vehicles which operate mostly on major highways. The disclosure describes a system which anticipates an uphill portion of the highway immediately following a downhill portion of the highway and anticipates the need for an increase throttle action by the heavy equipment vehicle while climbing the hill. Therefore, the system is designed to prevent the loss of momentum obtained by the vehicle as it is descending a hill and use the same momentum in ascending the anticipated following uphill climb.

U.S. Pat. No. 4,470,478 issued on Sept. 11, 1984, to Hayashi et al., "Vehicle Speed Control Apparatus With Set Increase," discloses a vehicle speed control system which is capable of preventing a setting operation from being carried out when an increase switch, for increasing the stored running speed, malfunctions.

U.S. Pat. No. 4,472,777 issued on Sept. 18, 1984, to Youngblood, "Engine Control Apparatus For Vehicle Speed," discloses a system which utilizes various sensors throughout the engine and vehicle and interfaces the signals from these sensors logically to a controller to limit the speed on the engine as a function of the condition of the sensors to, therefore, provide a safeguard against uncontrolled vehicle accelerations.

U.S. Pat. No. 4,479,184 issued on Oct. 23, 1984 to Nakano, "Device For Maintaining a Constant Vehicle Speed," discloses a cruise control system which utilizes a proportional speed error and two actuators to control the speed of the engine and, therefore, the speed of the vehicle. This is accomplished by controlling the main actuator which controls the throttle angle and, in addition, controlling the speed fluctuation by controlling an additional actuator which blends more or less error in an auxiliary passage around the throttle blade to alter the air fuel ratio in the engine and thereby control the speed fluctuations and fine tune the control of the vehicle speed.

U.S. Pat. No. 4,478,184 issued on Oct. 23, 1984 to Shinoda et al., "Speed Control System And Method For Automotive Vehicles," where a system is disclosed to adjust the absolute value of a differential speed signal and adjust the value of corresponding control signals to produce a correction to the vehicle speed based on the absolute value of the differential signal.

U.S. Pat. No. 4,484,279 issued on Nov. 20, 1984 to Muto, "Vehicle Speed Control Method," discloses a system which allows the driver, upon initiation of the speed control device, to select the initial speed that the vehicle is traveling upon the initial actuation of the set switch. The system provides for the selection of this initial speed regardless of the length of the actuation period of the set switch upon this initial engagement of the electronic cruise control.

U.S. Pat. No. 4,488,527 issued on Dec. 18, 1984, to Pfalzgraf et al., "Device For Controlling The Speed Of Travel Of An Automotive Vehicle" provides an alarm circuit and an interaction with a controller which generates an alarm if an error is detected such as a defect in the pedal contact or of the setting member contact and sends a signal to the controller which will limit the operation of the entire system to prevent dangerous conditions.

U.S. Pat. No. 4,501,284 issued on Feb. 26, 1985 to Kuno et al., "Speed Control Method And System For Automotive Vehicles," discloses a speed control system to precisely control the fuel supply into the engine over a wide range of vehicle speed by maintaining the resolution of the calculated value independent of the speed of the vehicle.

U.S. Pat. No. 4,516,652 issued on May 14, 1985 to Tanigawa et al., "Apparatus For Controlling The Speed Of An Automobile," discloses an apparatus for controlling the speed and interacting with the switch of the transmission gear in or out of an overdrive condition.

U.S. Pat. No. 4,522,280 issued on June 11, 1985, to Blaney, "Automatic Disengagement Device For Automotive Cruise Control System," describes a system which responds to the actuation or malfunction of a brake switch to disconnect the automotive cruise control circuitry; it also responds to the condition of a power lead connected to the throttle actuator to disconnect the cruise control in case of a malfunction and it also responds to a comparison of a predetermined threshold operating speed as compared to a peak operating speed which will result under certain conditions in the automatic disconnection of the electronic cruise control system.

U.S. Pat. No. 4,549,266 issued on Oct. 22, 1985, to Schneider et al., "Vehicle Speed Control," describes an automotive speed control system which uses logic activated switches on both sides of electrical solenoids which control vent and vacuum valves to reduce the effects of shorting a switch in a system utilizing only one switch in series with the solenoids.

U.S. Pat. No. 4,597,465 issued on July 1, 1986, to Burney, "Cruise Control System And Method With Overspeed Sensor," discloses a system to disengage the cruise control if an overspeed sensor which monitors the engine speed senses a sudden increase in the engine speed, such as may occur with the depression of the clutch in a vehicle having a manual transmission.

U.S. Pat. No. 4,606,425 issued on Aug. 19, 1986, to Hayashi et al., "Vehicle Speed Control Apparatus," is closely related to U.S. Pat. No. 4,470,478 which has already been described above.

U.S. Pat. No. 4,608,954 issued on Sept. 2, 1986, to Gray, "Input Circuit for An Electronic Vehicle Speed Control Unit," discloses an electronic control circuit to control the supply of vacuum which is resistant to spurious noise signals generated from such sources as the vehicle ignition system.

Of interest is SAE Paper No. 830662 by Peter G. Blaney entitled "Improvement To Cruise Controls Utilizing Microprocessor Technology" which was presented at the International Congress and Exhibition in Detroit, Mich., Feb. 28–Mar. 4, 1983. This paper is hereby expressly incorporated by reference.

Also of interest is a paper entitled "New LSI Circuits That Optimize Cruise Control Systems" by Mark L. Shaw, presented at the INTERNEPCON 1978 conference.

SUMMARY OF THE INVENTION

The following summary is generally divided into four major areas. The first area relates to operator switch inputs, solenoid time-out and validity tests for speed control conditions. The second section consists of the speed control calculations and algorithms. The third section handles the output of solenoid states. Finally, the speed sensor interrupt routine service and the diagnostics are described.

Switch Handling

Cruise Control On/Off Switch

The first routine to be entered upon calling the Cruise Control module is the on/off switch test. The switch is tested for an on or off state, indicating if power is applied to the vacuum valve body. If the switch is selected, a timer is incremented and the over speed/under speed test is then executed. Whenever the switch is off, both vent and vacuum pulse width timers are cleared. This will ensure that when cruise is selected, no spurious valve control pulses will be output. The brake flag is then set so that no speed control pulses could be output from the control algorithm. In order to ensure that upon selection of cruise control a valid vehicle speed calculation exists, speed is calculated regardless of the on/off switch selection. Without this feature, erratic set speeds will be experienced when the set switch is simultaneously toggled with the on/off switch. To prevent this, the 125 ms. timer is incremented and the program jumps to the subroutine "CKTIME." Here the timer is tested and, if ready, a vehicle speed calculation is performed.

High/Low Speed Lock Out

A speed lock-out is provided. If the vehicle or engine is above or below predetermined speed limits, the brake flag BRKSET is set, thereby preventing speed control. After the vehicle/engine enters the valid speed window, normal control is restored.

Test Solenoid Timers (Block 139)

Since the Cruise Control program is entered about every 11 msec., an 11 msec. timer resolution was chosen. Every program loop, the solenoid vacuum and vent timers are tested to make sure that they have timed out to zero. The values of these timers, if not zero, is decremented. If the timer is equal to zero, no decrement will occur and a hold throttle position solenoid pattern will be output. The vacuum timer is decremented from 1 of 0, an 11 msec. pulse; while the vent timer is decremented from 2 to 0, a 22 msec. pulse.

Brake Switch Logic

If the brake is applied, a BRKSET flag is set. The flag prevents any control action that would cause a vacuum pulse to be output.

P/N or Clutch Switch Test

Should the vehicles' shift selector be bumped from the drive position, while speed control is engaged, the engine speed will run away just as if the clutch were disengaged. Because of this, a Park/Neutral test has been added for automatic transmission versions of this program. If either a neutral or clutch release condition is indicated, a rapid vent (close throttle) pulse will be output and the brake flag BRKSET set to prevent an undesired return to computer control.

In manual transaxle vehicles, a hardware clutch switch can be replaced with an algorithm. In the algorithm, the N/V ratio (engine speed/vehicle speed) is calculated after each set or resume. This ratio, which is constant for each gear, is saved and compared with successive N/V calculations. If a ±25% difference is detected, the clutch is assumed to be depressed and the electronic speed control is disengaged. Speed control is also disengaged in this algorithm if engine speed exceeds 5000 rpm (or 4300 rpm is the car speed is less than the set speed).

Set Switch

The Set Switch is a multi-function input. It is used to enter a set speed command, a decel./set speed command, and to provide a means of increasing speed in cumulative 2 mph increments (Tap-up command). One parameter of the switch decoding is time. While the switch is on, the set switch timer is incremented at 11 msec. intervals and a flag set. The timer is checked to determine if it has been depressed for greater than 385 msec. If it has, the timer is clamped at this value to prevent timer overflow. Also, the BRKSET flag is set, causing the throttle to close. The initial speed set flag is cleared to prevent inadvertent resumption of cruise control while the set switch is depressed.

After the switch is released, the set switch flag is tested to determine if the switch has just been released. If the switch was just released, the switch timer is tested against the debounce time. An invalid switch reading will cause the timer and set switch flag to be cleared and the program will be allowed to continue as if no set switch activity were detected. A valid set switch contact would result in a test to see if a previous set had loaded a valid set speed. If this had been the initial activity on this switch, the current vehicle speed would be loaded into the set speed register, and the initial set speed flag would be set. If there had been a previous speed set, then the BRKSET flag would be tested. Should the BRKSET flag be set, a new set speed will be loaded. In the event that the initial set flag is set and the BRKSET flag is not set, the vehicle speed is compared to set speed. Should vehicle speed be greater than set speed by 2 mph a new set speed will be loaded equal to the current vehicle speed.

The last condition accounted for is the situation where vehicle speed error is within +2 mph and the parameters for a valid speed set are satisfied. This will cause the switch action to be interpreted as a tap and will cause +2 mph to be added to the previous set speed. If the switch had been decoded as a set, the setup vacuum pulse width will be calculated and stored in the vacuum pulse timer. The duration of the pulse is scaled to provide a best guess at an appropriate throttle position from which closed loop control could begin. The equation and values chosen for this pulse will directly effect sag or surge upon setting of desired speed. The chosen values are currently of the form $(((MPH-30)/2)+20)*11$ msec. As examples:

EX. 1. Set Speed = 30 mph
Set Speed Set P.W. = $(((30-30)/2)+20)11$ msec. = 220 msec. vac. pulse EX. 2. Set Speed = 60 mph
Set Speed Set P.W. = $(((60-30)/2)+20)11$ msec. = 385 msec. vac. pulse The set pulse width equation can be replaced with a look-up table called SETPW. This table must be calibrated so that neither speed sag nor overshoot occurs on a set speed.

Resume Switch

After the set switch has been tested and found to be inactive, the resume switch is tested and decoded. Upon entering resume the brake flag is tested. If the brake flag is not set, there is no reason to continue resume decode, the program will jump to "CKTME," as is the case with most other invalid resume parameters.

Next the Resume switch is tested for an on state. An "on" state is true if the set switch is not true and resume switch is true. This is important as the switches are hardware wired so that if the set switch is on, the resume switch is not valid. If the resume switch is in a valid on state, the "Accel" (ACLFLG) flag is tested. If it is found on, then this particular activation has already been serviced and a jump to "CKTIME" will be executed.

The vehicle speed is now tested for being in a valid controlled speed window. The last flag to be tested to validate a resume selection is the Initial speed set flag. If it is found true, then resume will be serviced. If not, as with previous tests, a program jump will occur to "CKTIME." Servicing Resume requires resetting the Resume flag (RESSW) and BRKSET flag. The ACLFLG flag must be set to allow a different acceleration rate from that used for normal hold speed corrections due to the magnitude of the difference between current vehicle speed and set speed.

Finally, a set pulse width is calculated. The set pulse width is equal to $(((Set\ speed-30)/2)+20)*11$ msec. Should vehicle speed be equal to or greater than set speed, then the set pulse width is loaded into the vacuum pulse width timer. However, if the vehicle speed is below set speed, an additional pulse duration is added to the set pulse to cause a throttle position to approximate that required to provide acceleration. The additional pulse width is of the equation (set speed−vehicle speed)*11 msec. As examples:

EX. 1. Set Speed = 60 mph, Vehicle Speed = 30 mph
Resume Setup
P.W. = $(((60-30)/2+20)+(60-30))11$
msec. = 715 msec.

EX. 2. Set Speed = 60 mph, Vehicle Speed = 55 mph
Resume Setup
P.W. = $((((60-30)/2+20)+(60-55))11$
msec. = 440 msec.

EX. 3 Set Speed = 60 mph, Vehicle Speed = 65 mph
Resume Setup P.W. = $(((60-30)/2)+20)11$
msec. = 385 msec.

After the vacuum pulse width has been calculated and stored in the vacuum timer, the program jumps to output the vacuum solenoid pulse.

The resume pulse width equation can also be replaced with a look-up table called RESTBL. This table must be calibrated to provide acceleration on a resume, without overshooting the set speed. If a resume is made from a vehicle speed that is below the set speed, the resume is made from a vehicle speed that is below the set speed, the resume and set (base) pulse widths are added. If a resume is made from a vehicle speed that is above the set speed, only the set pulse width is used.

Speed Control

CKTIME

"CKTIME" is the subroutine that tests the 0.125 msec. timer. The timer is incremented during the on/off switch test at the 11 msec. loop time interval. When the counter is equal to 11, the program is permitted to continue. It is pointed out that 11 counts at 11 msec. intervals is not 125 msec. but 121 msec. This timing deference is not critical to cruise control activity. If the timer does not indicate that time is up, then the program will return to the Main engine control module. Should the timer indicate 121 msec. then the timer is reset and speed control calculations will be made.

Speed sensor data is next tested to determine if a sufficient number of speed sensor interrupts have occurred to allow a speed calculation. Eight sensor interrupts occur every speedometer cable revolution. To reduce the effect of cable whip and switch pole to pole errors on speed measurements, it is necessary to calculate speed only after each cable revolution, thus 8 sensor signals must occur prior to a new speed calculation.

The current vehicle speed is now computed to mph*64 every 121 msec. This timing provides a reference for an acceleration calculation. As you can see, very little speed differential will occur in 121 msec., thus the need for a high resolution vehicle speed. At 1 mph/sec., only (1*64)/8 or 8 counts will be detected allowing for a ⅛ mph/sec. acceleration resolution! The vehicle speed is averaged and the calculated acceleration is filtered by adding the new acceleration calculation to the old and dividing by 2. The speed sensor event counter and elapsed time registers are cleared in this module. Speed sensor interrupt service can now be resumed.

The vehicle speed is computed to mph*64 every 121 msec. so the speed resolution is 1/64 mph.

CALERR

"CALERR" and "ERCHK" subroutines are where key speed control algorithms are installed.

It is in CALERR that speed error is calculated by finding the difference between set speed and vehicle speed and filtering the result. The error is tested for polarity to determine appropriate program flow.

A positive error causes an immediate reset of a flag labeled ACLFLG. Then the error is tested for its magnitude to decide upon a desired deceleration rate. Several bands of error are provided, which should allow sufficient calibration range for all vehicles.

Should a negative error, below set speed, be detected, the ACLFLG flag is tested to determine which set of acceleration rates should be used. In the event of the ACLFLG flag being set, a resume cruise control mode will be interpreted. In this case another test is made to see if vehicle speed is within range of the set speed, allowing a resumption of normal speed control function. Should vehicle speed be well below set speed, a 1.5 mph/sec. acceleration rate will be selected and will continue until a point is reached where a reduced acceleration rate will be employed until the acceleration mode cut-off point is reached. The current calibration for the acceleration mode cut-off for a vehicle with a turbocharged engine and automatic transmission is −1/32 of a mph. If the acceleration flag ACLFLG is not set, the acceleration rate is a function of speed error. Currently, a speed error of less than ⅛ mph has no speed correction, i.e. zero desired acceleration.

ERCHK

The subroutine "ERCHK" selects which, if any, error correction pulse output is required. The desired acceleration, (mph/sec)*−4, is added to an integration register. To this register is added actual vehicle acceleration, (mph/sec)*4. This "addition" results in the difference between desired and actual acceleration, which is the error to be integrated. The integral is now saved in the error integrator and tested for exceeding the positive trigger level, currently selected at 15. Should this value exceed the trigger point, a vent action will be called for. If the number is less than the minus trigger point, a vacuum action will be called. The condition for the integral being between the ± trigger points will result in a hold throttle position solenoid pattern to be output provided the vacuum timer is not still timing out. This is the primary strategy for providing a smooth control of vehicle speed. With this technique, steady state errors are eliminated and the system is stable. Speed/acceleration errors too small to require immediate correction, are accumulated until a sufficient number have integrated to indicate a pulse is to be output. The equation will always try to zero, resulting in no corrective action being required. Should an acceleration or deceleration be required, the negative of the desired acceleration will be integrated with actual acceleration, i.e.: for a speed error of −1 mph an actual desired acceleration of +¼ mph/sec. is called for. Therefore, if the actual acceleration is equal to zero, the integration register would begin to go negative. When the integration register has reached a negative 15, a vacuum pulse would be output causing the vehicle to accelerate. When the actual acceleration rate is equal to +¼ mph/sec., the equation will zero and no further correction will be required. The inverse is also true for actual acceleration being greater than desired acceleration. In this situation, actual acceleration, say +½ mph/sec, is greater than the required +¼ mph/sec. so that when integrated with a −¼ mph/sec., a positive term will result. This term will integrate until it exceeds +15 at which time a vent action will be called for. Please note that correction frequency is error magnitude dependent, the larger the error the more rapid the correction.

Secondarily, the integration action serves to filter transient acceleration calculation errors. Acceleration calculation errors are typically paired. Since calculated acceleration error is caused by a speed calculation error, acceleration error will occur first in one polarity and then in equal magnitude but opposite polarity, assuming the following speed calculation is not in error. This action results in error cancellation and no correction output.

Thirdly, the integration technique serves to dampen throttle response to prevent throttle correction at a faster rate than the vehicle can respond thereby reducing over and under shoot of the throttle. Should the vent valve respond slower than the vacuum valve, the integrator trigger levels can be adjusted to allow a vernier control of vent to vacuum response times.

The desired and actual acceleration terms are in (mph/sec)*32. The constant value trigger level has been replaced by two "gain" terms which are added together. These gain terms are determined from two look-up tables, THGAIN (throttle gain) and SPGAIN (speed gain). These two are the main calibration tables for speed control, i.e., for maintaining the vehicle speed at the set speed.

A new term, CLOTHR (closed throttle) is also used in the ERCHK subroutine to prohibit speed control from venting down to the minimum throttle position under normal operation. This calibration term is used to prevent low throttle surging.

Correction Set Up

The appropriate vent or vacuum valving operation has been previously selected by the subroutine "ERCHK." The error integrator is reset. Then the duration of the output pulse is selected. Presently only the vent pulse is varied and this only for severe overspeed conditions. If the vent pulse is called for and vehicle speed is greatly over set speed, an error condition is determined to exist and a large vent (throttle close) pulse is issued. Provisions for such a vacuum pulse have been made but are not implemented. After the pulse width timer is loaded, the program jumps to the selected pulse output subroutine.

The large vent (throttle close) pulse, which is output whenever vehicle speed greatly exceeds set speed (e.g., down a steep grade), has been replaced by two large vent pulses which depend on the new terms, VNTAB1 and VNTAB2.

If vehicle speed exceeds set speed by VNTAB1 (7 mph) or more, a 100% (125 msec.) vent pulse is output. A 50% (55 msec.) vent pulse is output if vehicle speed only exceeds set speed by VNTAB2 (5 mph). Normal speed control (22 msec.) vent is reactivated automatically when the vehicle speed reenters the set +5 mph window.

Solenoid Output

The "Solenoid Service" section outputs selected solenoid patterns for each of the vent, vacuum, and hold throttle position modes. Various registers are shared with the engine control software to toggle output ports. These registers are also updated to prevent inadvertent toggling of speed control valves. Two sets of solenoid patterns are defined in the software for turbocharged engines and throttle body injection engines (TBI). This is due to differing driver requirements between the Turbocharged engines and Throttle Body Injected (TBI) engine control systems.

Speed Sensor Interrupt Service

The speed sensor uses the Input Capture 2 (IC2) of the Motorola 6801U4, located in the logic module. This input allows speed sensor timing measurements to 1 usec. resolution. The occurrence of a signal at the IC2 can generate an "interrupt" for the program execution to update speed sensor information prior to the next sensor toggle. The speed sensor is a switch that makes eight closures per speedometer cable revolution. The closures occur at a rate of 2.222 HZ per MPH. Cable "whip" due to motion of the speedometer cable and differing magnetic pole strengths cause significant closure to closure timing errors. For this reason, closure to closure time is accumulated for one complete cable revolution. This technique seems to dampen any significant timing errors. At 30 mph, it takes about 120 ms. to make 1 cable revolution. A division of the delta time register by 4 prevents an overflow condition of the 16 bit timer accumulator. Speeds as slow as about 15 mph can be calculated without need to keep track of timer overflows. The 4 usec. resolution is still adequate for this application. The program is called via the interrupt structure and provides a minimum of service so as not to significantly delay other engine control processing. First entry into the service routine will cause a copy of the capture value of the free running counter to be saved as a base to calculate closure to closure times. On the next closure, a delta time is calculated, divided by four, and added to the previous delta time calculation. Finally, the old free running counter value is updated with latest value, the interrupt is cleared, the interrupt counter is incremented and the program is returned to its calling point. When the interrupt event counter indicates that a complete revolution has been completed, no further updates will be serviced. The program will return immediately after the event counter is tested and found complete. Thus, the elapsed time for one complete speedometer cable revolution is stored in the delta time register (INTTMR). Both the event counter and the delta time register are reset after the main cruise control module has processed the data into a speed calculation.

Diagnostics

Diagnostics check for speed control malfunction. While in speed control, the vacuum and vent solenoids, the wiring to the servo and the solenoid drivers, are checked for open or short circuits. If one is detected, a fault code is output. Also, in the diagnostics actuator test mode, the vacuum and vent valves can be pulsed for two seconds. Using a secondary vacuum source (the engine must be off), operation of the servo can then be examined.

This application is one of four filed on the same date, all commonly assigned and having similar specifications and drawings, the four applications being identified by titles and inventors as follows:

| Title | Inventor(s) | U.S. Ser. No. |
| --- | --- | --- |
| Method Of Determining And Using A Filtered Speed Error In An Integrated Acceleration Based Electronic Speed Control System For Vehicles | Jay C. McCombie | 07/023,165 |
| Method Of Determining And Using An Acceleration Correction In An Integrated Acceleration Based Electronic Speed Control System For Vehicles | Jay C. McCombie | 07/023,055 |

-continued

| Title | Inventor(s) | U.S. Ser. No. |
|---|---|---|
| In An Electronic Speed Control System For Vehicles, A Method Of Determining The Condition Of A Manual Transmission Clutch And Of A Park/Neutral Gear In An Automatic Transmission | Douglas C. Frantz William R. Kissel James L. Vincent | 07/023,164 |
| Method Of Disabling A Resume Switch In An Electronic Speed Control System For Vehicles | Douglas C. Frantz | 07/023,166 |

BRIEF DESCRIPTION OF THE DRAWINGS

Other objects, features and advantages of the present invention will become more fully apparent from the following Detailed Description of the Preferred Embodiment, the appended claims and in the accompanying drawings in which:

FIG. 1 is a block diagram of the electronic speed control system;

FIG. 2 is a chart depicting the operation of the vacuum solenoid and the vent solenoid and the corresponding throttle action which is a function of the current flow through the solenoids;

FIG. 3 is a schematic diagram of the speed sensor signal conditioning circuit;

FIG. 4 is a schematic diagram of the throttle position indicator signal conditioning circuit;

FIG. 5 is a schematic diagram of the network switch filter;

FIG. 6 is a schematic diagram for the peripheral interface/signal conditioner and solenoid drivers;

FIG. 7 is a flowchart of an overview of the method for electronic speed control;

FIG. 8 is a continuation of the overview flowchart in FIG. 7 of a method for electronic speed control;

FIG. 9 is a detailed flowchart of the method for electronic speed control;

FIG. 10 is a continuation of the detailed flowchart of the method for electronic speed control begun in FIG. 9;

FIG. 14 is an interpolation point-slope curve for the set pulse width variable SETPW;

FIG. 15 is an interpolation point-slope curve for the resume pulse width variable RESTBL;

FIG. 16 is an interpolation point-slope curve for the vacuum solenoid acceleration rate variable VACACC;

FIG. 17 is an interpolation point-slope curve for the vacuum solenoid regular desired acceleration rate variable VACREG;

FIG. 18 is an interpolation point-slope curve for the vent solenoid regular desired acceleration rate variable VENTRG;

FIG. 19 is an interpolation point-slope curve for the throttle gain factor THGAIN;

FIG. 20 is an interpolation point-slope curve for the speed gain factor SPGAIN;

DETAILED DESCRIPTION OF THE PREFERRED EMBODIMENT

Figure 11:
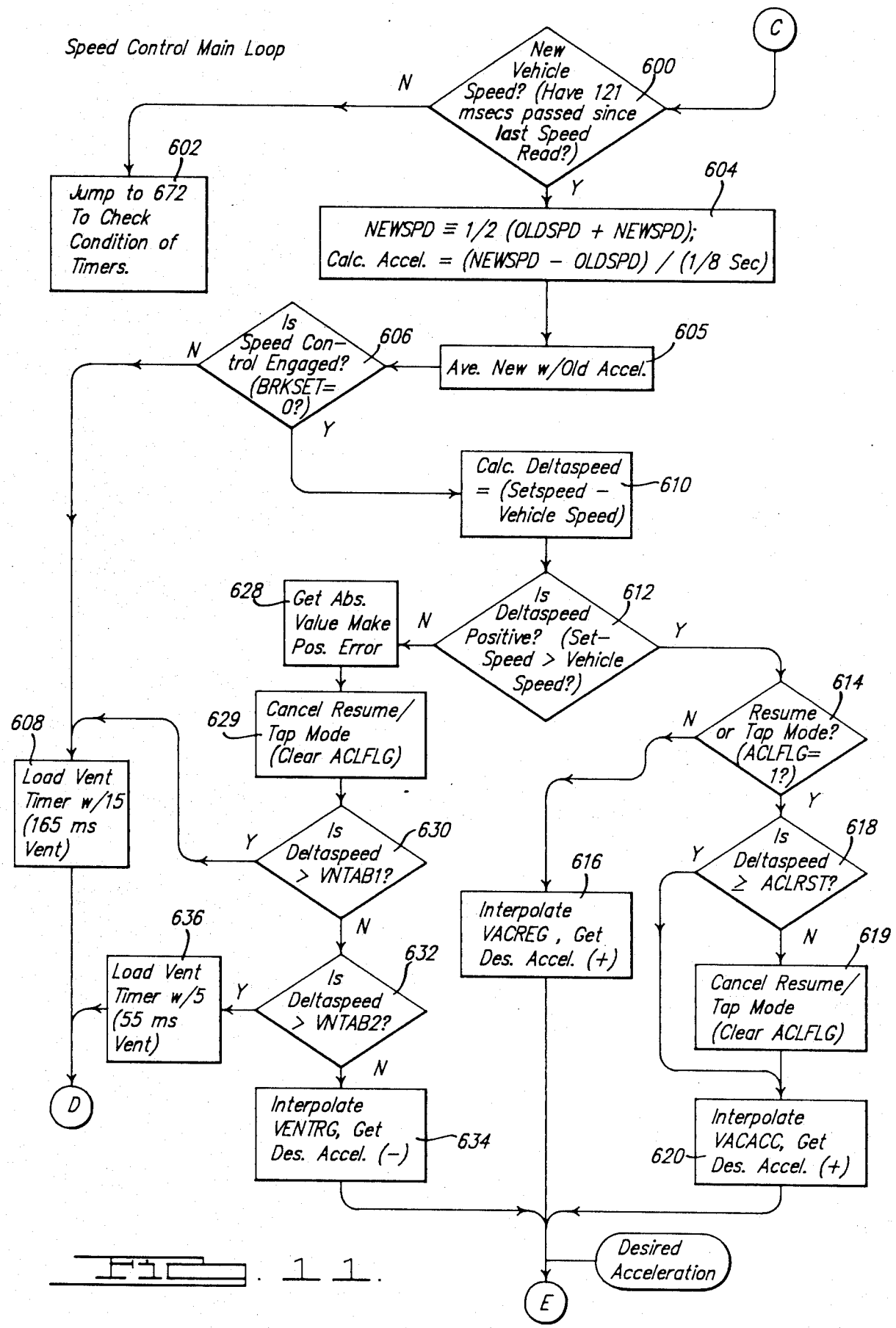
FIG. 11 is another continuation of the detailed flowchart of the method for electronic speed control begun in FIG. 9.
Figure 12:
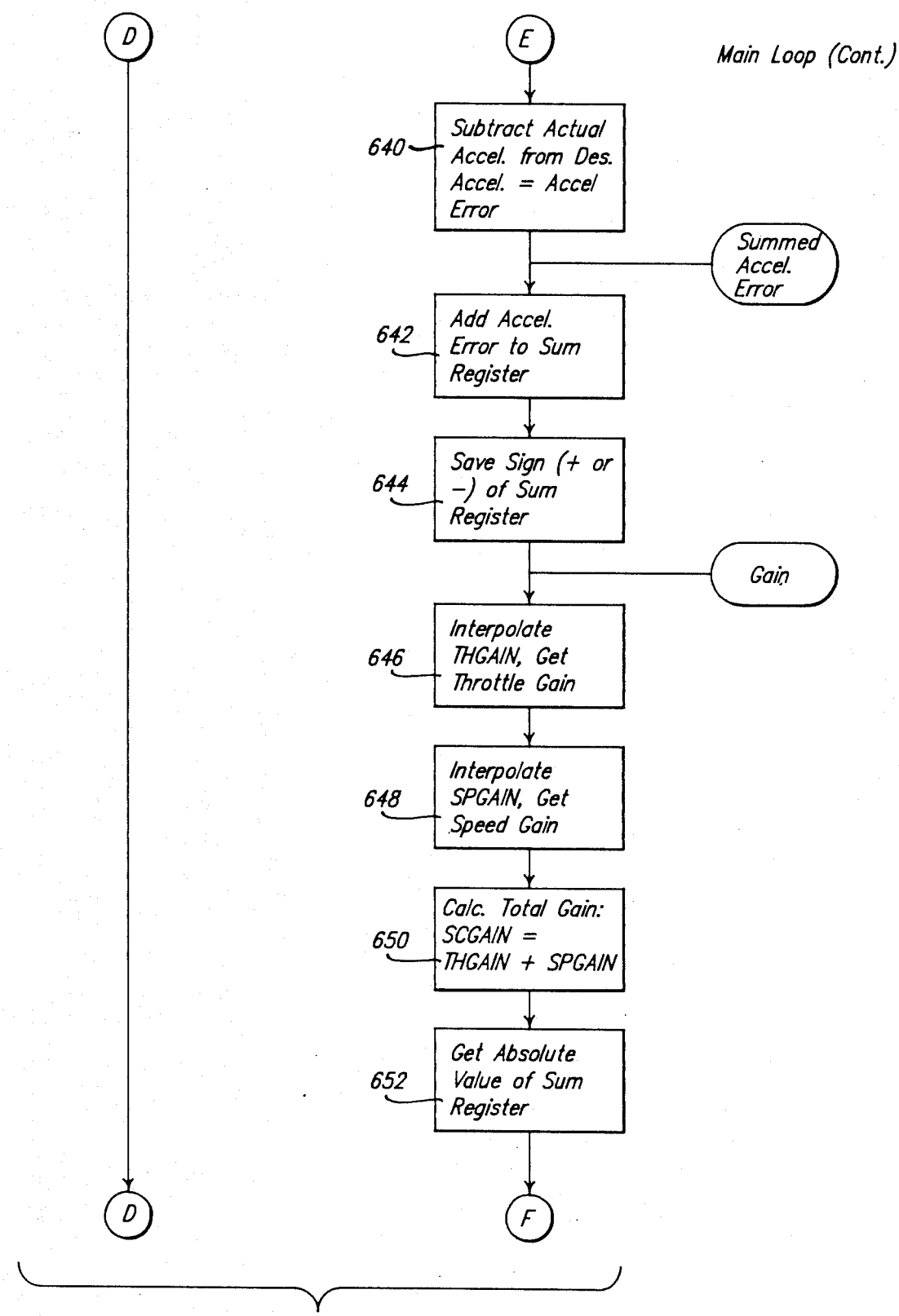
FIG. 12 is still another continuation of the detailed flowchart of the method for electronic speed control begun in FIG. 9.
Figure 13:
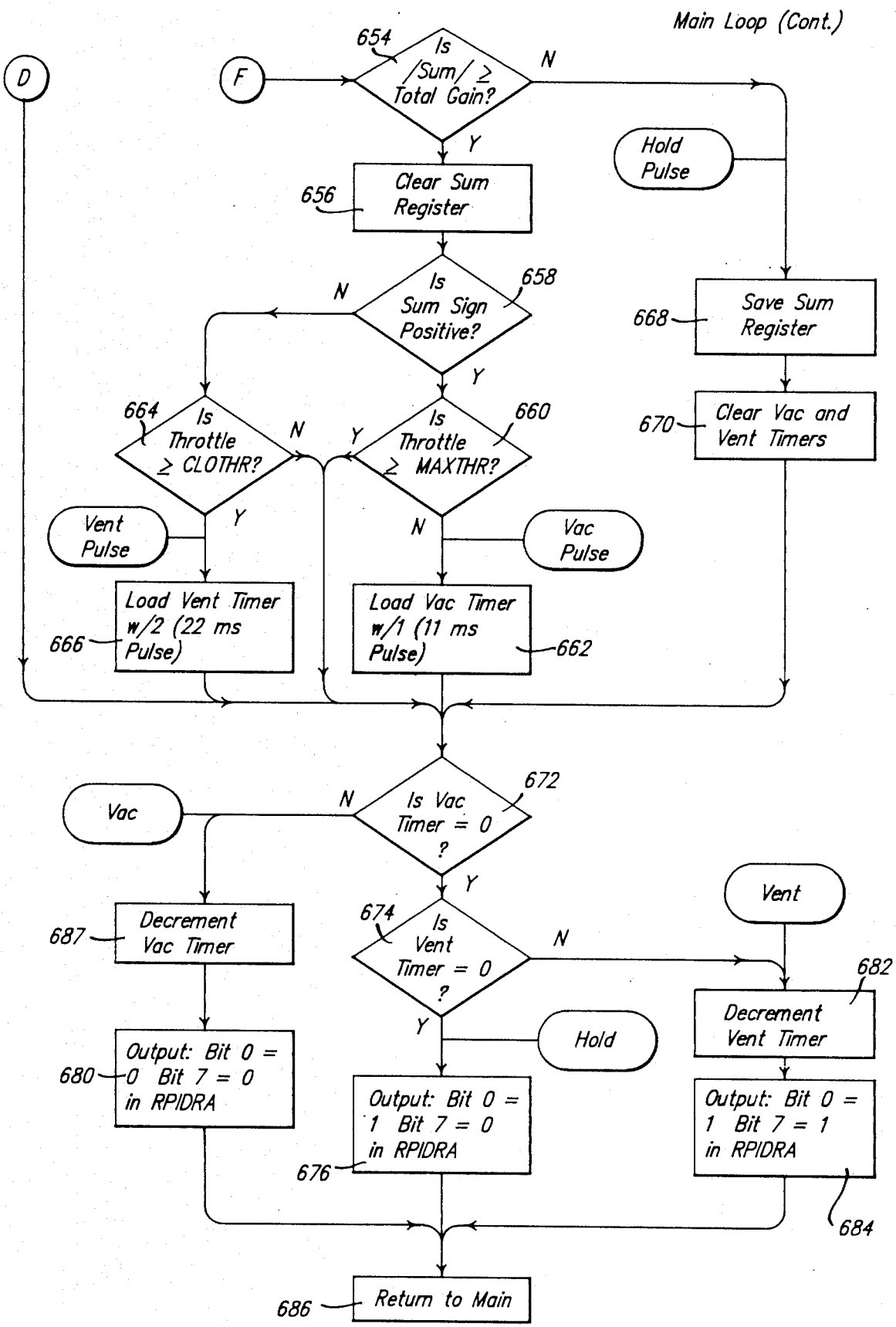
FIG. 13 is yet another continuation of the detailed flowchart of the method for electronic speed control begun in FIG. 9.

The basics of automotive electronic cruise or speed control is explained in Chapter 8 of *Understanding Automotive Electronics* by Ribbens and Mansour, published by Texas Instruments and distributed by the Society of Automotive Engineers (SAE). Chapter 8 is entitled "Vehicle Motion Control", pages 209–230, and is hereby expressly incorporated by reference.

Referring to FIG. 1, a block diagram of the electronic speed control system is shown. Central to the system is the engine control logic module 50 which controls many things in addition to the speed control, such as engine timing and some of the fuel tasks. The heart of the engine control logic module 50 is the microcontroller Z20 which works in tandem with memory means such as a programmable read-only memory and/or random access memory (MEMORY) Z51. The microcontroller Z20 accepts signals from signal conditions 58, 60, 62, 64, 66 and 68. In addition, the microcontroller Z20 sends signals and receives signals from the vacuum solenoid driver/interface 54 and the vent solenoid driver/interface 56.

The function of the vacuum solenoid driver/interface 54 and vent solenoid drive/interface 56 is to control the operation of the vacuum solenoid 34 and the vent solenoid 36. The operation of these solenoids, as well as purge vent solenoid 38, will control the vacuum actuator 44 which in turn controls the throttle position. Purge vent solenoid 38 is connected between ground and $V_{CC}$ via series switches per power on/off 74A and brakes 80A (also shown in block 74 and block 80 for ease of description). The solenoid 38 purges the vacuum actuator 44 if brake switch 80A or power on/off switch 74A is opened after the electronic speed control system shown in FIG. 1 has been "on". Connected to the throttle (not shown) is a throttle position indicator 46 which also sends information back to microcontroller Z20 via A/D converter Z85. This is shown in block diagram form in FIG. 1, and is completely described in commonly assigned U.S. Pat. No. 4,637,361 entitled Non-Adjustable Throttle Position Indicator to Killen et al. of Jan. 20, 1987, and is hereby expressly incorporated by reference; this non-adjustable throttle position indicator is one of the methods which can be employed to record the throttle position and indicate the throttle position in an electronically controlled engine system.

Also hereby expressly incorporated by reference are the following documents: U.S. Pat. No. 4,335,689 to Abe et al. dated June 22, 1982 entitled "Electronic Type Air/Fuel Ratio Control System"; U.S. Pat. No. 4,508,078 to Takeuchi et al. dated Apr. 2, 1985, entitled "Electrically Operated Engine Throttle Valve Actuating Device"; and U.S. Pat. No. 4,492,211 to Shimomura et al. dated Jan. 8, 1985, entitled "Air-To-Fuel Ratio Control System For Internal Combustion Engine".

Referring now to FIG. 2, a chart depicting the operation of the vacuum solenoid 34 and the vent solenoid 36 and the corresponding throttle action which is a function of the current flow through the solenoids. More specifically, in the chart the current flow through the solenoid will be indicated by a logical "one." Likewise, the lack of a current flow through the solenoids will be indicated by a logical "zero."

The throttle action is indicated in FIG. 2 by the following labels on the rows: open, close and hold. It can be seen that the throttle action is open if both vacuum and vent solenoids 34 and 36, respectively, have current flow through them. Similarly, the throttle action is closed if the current flow through the vacuum and vent solenoids 34 and 36, respectively, is "zero." Likewise, the throttle action is in a hold position if the vacuum solenoid 34 has no current flow through it and the vent solenoid 36 has current flow.

Returning now to FIG. 1, the signal conditioning blocks 58, 60, 62, 64, 66 and 68, all take their input signals from various sensors/actuators, etc., throughout the vehicle and, more specifically, get their inputs from some specific control mechanisms, some of which are dedicated to the electronic speed control operation.

For example, referring to the signal conditioning block 58, the function of this block is to accept a signal from the set switch 70 which is located on a stalk switch assembly which has other functions to control the wiper mechanisms Hi/Lo beam headlamps and the turn signals of the vehicle. A more descriptive treatment of such a stalk switch assembly can be found in a commonly assigned U.S. Pat. No. 4,219,706 dated Aug. 26, 1980 to David A. Koch, Micheal G. Moore and Arthur L. Pawlus entitled "Steering Column Mounted Control Stalk With Multiple Actuators For Rotatable and Slide Type Switches" which is hereby expressly incorporated by reference.

Referring now to the signal conditioning block 60, the function of this block is to receive a signal from the resume switch 72 which is described in '706 patent.

Referring now to the signal conditioning block 62, its function is to receive a signal from the power on/off switch 74 which is also described in the '706 patent.

Referring now to the signal conditioning block 64, its function is to receive a signal from the park/neutral or clutch switch 76. This function is also described in the '706 patent.

The function of the signal conditioning block 66 is to receive a signal from the speed sensor 78 as shown in FIG. 1.

The function of the signal conditioning block 68 is to receive a signal from the brake switch 80 the function of which is also explained in the '706 patent which has been expressly incorporated by reference.

Referring again to FIG. 1, the circuit is powered by a 12-volt supply from the battery of the vehicle. The power on/off switch 74 which is shown as a block, is also schematically shown as switch 74A. Likewise, the brake switch block 80 is also shown schematically as 80A. The two switches are in series with the 12-volt supply and the solenoid bank composed of the vacuum solenoid 34, vent solenoid 36 and purge vent solenoid 38.

The vacuum reservoir 42 receives vacuum via vacuum source 40 from the engine vacuum lines (not shown) which are generally available in the engine compartment of an automotive vehicle. The vacuum reservoir 42 feeds its vacuum to the vacuum valve body 32 which is metered by the vacuum solenoid 34, vent solenoid 36 and purge vent solenoid 38. In turn, the vacuum valve body 32 controls the vacuum actuator 44 which in turn controls the throttle which is not shown.

Referring now to FIG. 3, a schematic diagram is shown of the speed sensor signal conditioning circuit which is typical of the blocks shown in blocks 58, 60, 62, 64, 66, and 68. For example, shown is the vehicle speed sensor signal from speed sensor 78 being presented to an RC network powered by $V_{CC}$. The $V_{CC}$ voltage is divided down through resistor R76 which, in the preferred embodiment, has a value of 5.1 Kohms. The vehicle speed sensor signal is presented to the juncture of resistor R76 and resistor R125. Resistor R125 has a value of 20 Kohms and is in series with resistor 76 and is connected on its other end to capacitor C126 which has a value of 0.1 Microfarads. The capacitor C126 is connected between resistor R125 and ground potential.

The vehicle speed sensor signal from vehicle speed sensor 78 is presented through the RC network formed with the above recited components to an inverter which is represented as Z8. The signal is then presented to the microcontroller Z20.

FIG. 4 is a schematic diagram of the throttle position indicator signal conditioning circuit. The throttle position indicator signals from the throttle position indicator 46 are presented to the juncture of an RC network. The entire circuit is powered by a power signal $V_{CC}$ and is divided through a resistor R155 which has a value of 100 Kohms. The throttle position indicator signal is presented to the juncture of resistor R155 and a series connected resistor R156 which has a value of 10 Kohms. The other end of resistor R156 is connected to a capacitor C157 which has a value of 0.1 Microfarads. The capacitor C157 in turn is connected to ground.

The throttle position indicator signal is presented to an A/D converter shown as Z85 in FIG. 1 and FIG. 4 through the RC network. The resultant converted signal from A/D converter Z85 is then presented to the microcontroller Z20.

Referring now to FIG. 5, a schematic diagram is shown of the network-switch filter for signals from the set switch 70 or resume switch 72, park/neutral or clutch switch 76 and brake switch 80. An 8-volt supply is shown as powering the network-switch filter circuit. The various components are used to modify the signal as received from the various switch inputs and as sent out to the various signal conditioning (peripheral interface) blocks 58, 60, 62, 64, 66 and 68 which are shown in FIG. 1. The circuitry is repetitive and two of the repeating portions of the circuit are illustrated. The power signal of 8 volts is buffered through resistor R1 and R6, etc., and a signal input is received from various switches and presented to the juncture of resistor R1 and another resistor R2. The resistor R2 is connected to ground through a capacitor C5. The ground potential is then pulled up through resistors R3 and R4 which also receive a portion of the signal which has been presented through the juncture of R2 and C5. The signal output to the signal conditioning (peripheral interface) blocks 58, 60, 62, 64, 66 and 68 is then sent from resistor R3 or its equivalent in the other circuits.

Referring to FIG. 6, illustrated is a schematic diagram for the peripheral interface/signal conditioner and solenoid drivers. As shown, the peripheral interface/signal conditioner chip designated as Z83 has many switch input ports which are shown in FIG. 5. The peripheral interface Z83 also sends and receives signals to and from the microcontroller Z20. In addition, the peripheral interface Z83 sends signals to the vacuum solenoid 34 and the vent solenoid 36; Z83 includes the function of the signal conditioning blocks 58, 60, 62, 64, 66 and 68 from FIG. 1, as well as the interface function of blocks 54 and 56 from FIG. 1. The solenoid driver function of blocks 54 and 56 is separately shown in FIG. 6. These solenoid driver signals are then fed to a typical solenoid driver circuit which is schematically represented in FIG. 6. The solenoid driver circuits are essentially the same in each case. Shown is a signal presented in parallel to a resistor RC40C which has a value of 12 Kohms. In parallel with resistor RC40C, is capacitor RC40B which has a value of 0.0022 Microfarads. This conditions the signal from the peripheral interface Z83 and presents it to an amplifier Z43 for presentation to the vacuum solenoid 34 or vent solenoid 36 as filtered by a capacitor RC40D which has a value of 0.0022 Microfarads. The capacitor RC40D is connected across the output of the amplifier Z43 to ground. For feedback purposes, the feedback resistor RC40A is provided which has a value of 27 Kohms. The diagnostic function of this circuit is completely described in the commonly assigned U.S. Pat. No. 4,612,638 to Kissel and issued on Sept. 16, 1986, entitled "Diagnostic Protection Circuit and Method Using Tri-State Control And Positive Feedback" which is hereby expressly incorporated by reference.

Referring now to FIG. 7 and FIG. 8, an overview of the method for electronic speed control is shown in flowchart form.

The method begins in block 100. It is to be recognized that the engine control logic module 50 controls a large number of sensors, actuators, etc., throughout the engine and receives data from various points. Therefore, the microcontroller Z20 is doing many things and will have a main control program which is either interrupted for use by the electronic speed control system shown in FIG. 1, or is branched from in order to respond to the needs of the electronic speed control system. Therefore, block 100 is represented as jump from the main program. An equivalent would include the use of a microcontroller or microprocessor dedicated to the electronic speed control function.

The method next calls, in block 110, for a check of the speed control power on/off switch 74A. The method checks the speed control power on/off switch 74A to see whether it is on or off. If it is off, the method then proceeds to block 112 to clear the set speed stored in memory Z51 to eliminate a resume condition from occurring after engine restart and then to disengage the speed control in block 120 and to eventually return to the main program in block 210.

Returning to block 110, if the power on/off switch 74 is on, the method falls through to block 130 to see if the resume switch 72 is locked on. If not, the method clears the RESSW flag in block 131. If the resume switch 72 is locked on, the method branches to block 132.

Next, the method goes to block 132 to check to see whether the vehicle is ready for speed control. This condition is usually indicated by a call for some type of speed adjustment, i.e., whether car speed is above or below a window of acceptable speed around a set speed or whether the operator has called for the first instance of speed control by engaging the power on/off switch 74 and the set switch 70.

Next, the method checks in block 133 to see whether the engine speed is too high. This is done by taking an input, the engine speed, which is available information from the other portions of the engine control logic module 50 and is generated initially by speed sensor 78. The engine speed is then compared to a value stored in the MEMORY Z51 and if it is too high, the method branches to block 120 to disengage the speed control. If, however, the engine speed is not too high, the method branches to block 134 to check to see whether the last vehicle speed as sensed in speed sensor 78 is too low to allow the use of the electronic speed control. If the last vehicle speed sensor is too low, the disengaged speed control operation occurs in block 120. That is, the sensed vehicle speed and engine speed are compared to predetermined limits stored in memory Z51. If outside the limits, the electronic speed control is disengaged.

If the last vehicle speed is not too low, the method falls out of block 134 and then either checks in block 135 to see whether the vehicle is in park or neutral or checks to see whether the clutch is depressed in block 135. The choice will be determined by the type of transmission employed in the vehicle, the block 135 being used if the vehicle employs an automatic transmission and block 136 being employed if the vehicle utilizes a manual transmission. If the clutch is depressed or if the vehicle is in park or neutral, as checked in blocks 135 and 136, the method branches to block 120 to disengage the speed control.

If the vehicle is not in park, neutral as checked in block 135, or the clutch is not depressed as checked in block 136, the method falls through to check whether the brake is applied in block 138, disengaging the speed control in 140 if it is applied and, if not, going to block 139 to check to see whether the vacuum solenoid and vent solenoid parts are working. If not, the method branches to a fault routine in block 141, returns and disengages the speed control in block 140. If the ports are working, as checked in block 139 (utilizing the method and circuitry described in commonly assigned U.S. Pat. No. 4,612,638, "Diagnostic Protection Circuit And Method Using Tri-State Control And Positive Feedback," which has been incorporated by reference), the method falls through to block 150 to check to see whether a set condition is called for by the operation of the set switch 70 in the stalk column. If the set is called for as checked in block 150, the method branches to block 160 to save the vehicle speed as it currently exists and defines this as the set speed.

Returning to block 150, if the operator has not called for a new set speed, then the method checks to see whether this is a tap in block 170. This refers to the tapping of the set switch 70 on the stalk switch assembly located on the steering column. If a tap condition has occurred, then the method branches to 180 to add 2 miles per hour to the set speed and then opens the throttle slightly in block 182 before engaging the speed control in block 202.

Returning now to block 170, if the condition is not a tap, then the method falls through to block 190 to check to see whether the condition as sensed is a resume condition as called for by the operation of the resume switch 72 on the stalk column. If the resume condition is called for in block 190 or the set condition is called for in block 190, the method then flows to block 200 to open the throttle and then engage the speed control in block 202.

Returning to block 190, if the resume condition is not sensed, then the method checks to see whether the operator has called for a deceleration/reset condition by appropriate operation of the set switch 70 on the stalk switch assembly on the steering column. This occurs when the operator of the vehicle continuously depresses the set switch 70 and holds it until the desired lower speed is achieved. If the method detects a deceleration/reset condition in block 192, it branches to block 194 to disengage the speed control, close the throttle in block 196 and upon release of the set switch (button) 70 on the stalk by the operator in block 198, the method will save the vehicle speed as the set speed and return to block 200 to open the throttle and engage the speed control in block 202.

Returning to block 192, if the condition detected is not a deceleration/reset condition, the method skips to block 203 to see if it is time to calculate the vehicle speed. Block 204 is entered after 121 msec. have passed and vehicle speed is calculated according to the formula (utilizing a speed sensor 78 interrupt service) (where "=" means "is redefined as"):

$$\text{Old Vehicle Speed} - \frac{\text{New Vehicle Speed taken after 121 msec}}{2} = \text{New Vehicle Speed}$$

In essence, if the program skips block 202 and enters block 203 directly, this means that either it is not desired to engage the electronic speed control (although the vehicle conditions may allow for it to be engaged) or it is already engaged and the operator of the vehicle desires for the speed control to continue unchanged. Similarly, if the method arrives at block 202 (from block 200), this means that the operator desires the speed control to begin or to become engaged, or that the operator of the vehicle wants to make a change in the speed control set speed.

All conditions prior to the calculation of the vehicle set speed in block 204 are checked every time the main program completes a loop which is every 11 msec. Vehicle speed is updated on a speed sensor 78 interrupt basis; i.e., when 8 pulses have been detected (signifying one complete revolution of the speed sensor cable) as new vehicle speed is calculated. Waiting 121 msec. (11 main program loops) assures us that a new vehicle speed has been calculated (is ready). If a new vehicle speed is not ready (i.e., the 121 msec. have not passed), we return to the main program in block 210 and wait for another interrupt to occur.

Next, the method falls through to block 206 to calculate the vehicle acceleration according to the formula (Note: division $8 = \frac{1}{8} = 0.125$, a close approximation to 0.121):

$$\frac{1}{2}(((\text{last vehicle speed} - \text{new speed}) \div 0.125 \text{ msec.}) + \text{last vehicle acceleration})$$

Next, the method falls through to block 208 to check to see whether the speed control is engaged.

The actual physical disengagement of the speed control involves the reading of a flag BRKSET by the program. This is done at block 208. The speed control is engaged if the BRKSET flag is set to a logical zero condition and is disengaged if the BRKSET flag is set at a logical one condition.

If the flag BRKSET is a logical one, the program calls for a 165 msec. vent pulse output, which is the maximum possible. A vent timer will then be reloaded with 165 msec. until the BRKSET flag is cleared which happens in blocks 150, 170, 190, 192 and 202 after the operations in each of those respective blocks.

If the vehicle's brakes are applied while the vehicle is cruising or operating under electronic speed control, or if the power on/off switch 74 is turned "off", the BRKSET flag goes to a logical "1" level. The BRKSET flag goes to a logical zero (clear) when the vehicle is cruising under electronic speed control (including TAP, SET and RESUME functions and excluding DECELERATION (note that BRKSET is cleared when the set button is released after DECEL)). Therefore, the BRKSET flag is the electronic speed control engage/disengage indicator.

If the speed control is not engaged, the method branches to block 209 to begin or to continue venting the vent solenoid 36 and then moves to block 210 and returns to the main program. If the speed control is engaged as checked in block 208, the method falls through to block 220 to calculate the speed error which is a plus or minus signal. Next, the method falls through the block 222 to look up in a table in memory Z51 or to calculate the desired acceleration which can be a plus or a minus signal.

The method calculates the acceleration error (the difference between the desired acceleration and the actual acceleration) which is also a plus or a minus signal which is also in block 224 and adds it to the previous acceleration errors in block 226.

Next, the summed acceleration limit is calculated or looked up in a table in memory Z51 as shown in block 228 and then checked in block 230 to see whether the summed acceleration error is greater than a designated limit. If the summed acceleration error is less than a designated limit, the method branches to block 240 to save the summed acceleration error and to maintain the throttle position in block 242 and to return to the main program in block 244.

Returning to block 230, if the summed acceleration error is greater than a predetermined limit, the method falls through to block 250 to clear the summed acceleration error and then proceeds to block 252 to check to see whether acceleration is needed to return to the set speed. If not, the method falls through to block 270 to decelerate or close the throttle slightly and to return to the main program in block 272.

Returning to block 252, if acceleration is needed to return to the set speed, then the method branches to block 260 to accelerate or open the throttle slightly and then return to the main program in block 272.

Referring now to FIG. 9, FIG. 10, FIG. 11, FIG. 12 and FIG. 13, detailed flowcharts are presented describing the method for electronic speed control claimed herein.

As previously described, the integrated electronic speed control method described herein is designed to be integrated into the control strategy of the engine control computer and used on an as-needed basis. Therefore, block 500 shows a jump step to the electronic speed control software methods from a main engine control strategy being utilized by the engine control logic module 50. It is to be appreciated that all the functions described herein could be incorporated into a microcontroller dedicated to electronic speed control thereby eliminating the need to jump from a main program.

The method first checks to see whether the power on/off switch 74 is on in block 502. If not, the method clears the variable reserved for the vehicle set speed (SETSPD) in block 501 to eliminate a resume condition after engine restart (reference: block 112), and then branches to block 540 to disengage or "break" the electronic speed control and to set the BRKSET flag indicating that the speed control is stopped or disengaged, clear the ACLFLG (the RESUME/TAP MODE indicator), and to clear the SETFLG (the indicator for set switch 70) and clear the set switch timer.

If the electronic speed control power on/off switch 74A is on, the method falls through to block 503 to see if the resume switch 72 is locked on. If not, the method clears the RESSW flag in block 503A. If the resume switch 72 is locked on, the method branches to block 504. (This explanation can be cross referenced to block 130 and following in the overview flowcharts shown in FIG. 7 and FIG. 8.)

Next, the method falls through to block 504 to check the engine speed to see whether it is above 5,000 rpm (reference: block 133). If it is, the method again branches to block 540 to disengage the electronic speed control, set the BRKSET flag, clear the ACLFLG, clear the SETFLG, and clear the SET SWITCH timer. If the engine speed is less than 5,000 rpm, the method falls through to block 506 to monitor the vehicle speed and check to see whether it is less than a variable called low speed cut-out, hereinafter abbreviated LOSPCO (reference: block 134). The LOSPCO is a variable which can be stored in a look-up table in memory Z51 in the engine control logic module 50. LOSPCO is the minimum speed at which the electronic speed control system shown in FIG. 1 will operate or stay engaged; otherwise, block 540 is entered.

If the vehicle speed is greater than LOSPCO, the method falls through to block 508 to check to see whether the transmission is in park or neutral (as indicated by the park/neutral switch on an automatic transmission equipped vehicle) or to block 510 to check whether the clutch is depressed (as indicated by the clutch switch for a manual transmission equipped vehicle). These switches are represented in the diagram in FIG. 1 as block 76 and can be either a hardware switch or a software switch of flag. This corresponds to block 135 and block 136 in FIG. 7.

If the transmission is in park/neutral or the clutch is depressed as indicated by switch 26, the method branches to block 540 to disengage the electronic speed control, to set the BRKSET flag, clear the ACLFLG, clear the SETFLG and clear the set switch timer. If the park/neutral/clutch switch 76 is off, the method falls through to block 512 to check to see whether the brake is applied. This is determined by looking at the condition of the brake switch 80. If the brake has been applied, the method branches to block 540 to disengage the electronic speed control as previously described. This corresponds to block 138 in FIG. 7. If the brake is not applied, the method falls through to block 514 to another decision block to check the vacuum and vent ports to see whether they are working. These ports are on microcontroller Z20. This is done via the circuitry and method described and claimed in commonly assigned U.S. Pat. No. 4,612,638, "Diagnostic Protection Circuit and Method Using Tri-State Control and Positive Feedback" to Kissel which has been expressly incorporated by reference. If not, the method branches to block 520 and jumps to a fault routine hereinafter called FAULTL, generates and stores a diagnostic fault code and then returns proceeding to block 540 to disengage the electronic speed control as previously described. This corresponds to block 139 on FIG. 7.

If the vac/vent ports on microcontroller Z20 are working, the method falls through to block 530 to check to see whether the set switch 70 is on (reference: blocks 150 and following).

If the set switch 70 is on, the method falls through to block 531 to set the set switch indicator flag (SETFLG) and then to block 352 to increment the set switch timer internal to the microcontroller Z20. The set switch timer is set for 11 msec. of counts. Next, the method falls through to block 534 to check to see whether the set switch 70 has been engaged for a time period greater than a variable called SETIME. The variable SETIME is a stored value in memory of Z51 which is a time period of about 400 msec. beyond which, if the set switch 70 is still engaged, that the electronic speed control system shown in FIG. 1 will interpret that the operator of the vehicle desires to decelerate the vehicle down from the current set speed. The speed of the vehicle coasts down, therefore, decreased by a continuous depression of the set switch 70. If the set switch 70 has been depressed for a time greater than SETIME, the method branches to block 540 to disengage the speed control which acts to decelerate or to coast the vehicle and to reset the speed control. If the set switch 70 has not been depressed for the SETIME, the method falls through to block 600 (to be explained below).

Returning now to block 530, if the set switch 70 is *not* depressed, the method branches to block 548 to see if the set switch 70 *was* depressed previously, during the current drive time. This is done by looking at a flag SETFLG stored in memory Z51 to see if SETFLG equals 1. If the set switch 70 was not depressed as checked in block 548, the method branches to block 582 to see whether a RESUME condition exists.

If the resume switch 72 is not depressed, the method branches to block 600, the operation of which will be explained below.

If the resume switch 72 is depressed as checked in block 582, the method falls through to block 586 to see whether ACLFLG flag is set or clear. If the flag is set, the method branches to block 600.

If the ACLFLG flag is clear, the electronic speed control via microcontroller Z20 interprets the action of the operator as a RESUME condition and proceeds accordingly. The method then sets ACLFLG and clears BRKSET in block 587 and then falls through to block 588 to interpolate the SETPW variable (see description with respect to block 564) and get the appropriate number of set pulses in multiples of 11 msec. counts. Next, in block 590, the method checks to see whether the vehicle speed is greater than the set speed. If so, the method branches to block 570. If the vehicle speed, as checked in block 590, is less than the current set speed, the method falls through to block 592 to interpolate the variable RESTBL which is an additional source of vacuum pulses for RESUME conditions. This means that the resume pulses are retrieved in multiples of 11 msec. counts. The interpolation proceeds as described with respect to blocks 564 and 588. There is a separate look-up table in memory Z51 for RESTBL. The data comes from a point slope curve similar to that shown in FIG. 15. The data in the table is a function of the difference or delta between the speed the vehicle is traveling as compared to the set speed from memory Z51.

Next, the method falls through to block 594 to add the resume pulse to the set pulse and then branches to block 570 to load the vacuum timer internal to microcontroller Z20 with the set pulse before falling through to block 600.

If the set switch 70 was depressed as checked in block 548, the method clears the flag SETFLG in block 549 and then falls through to block 550 and checks to see if the set switch 70 was depressed for greater than 22 msec. This 22 msec time period is called the debounce time. A timer within the microcontroller Z20 monitors this time period. The debounce time is experimentally determined to be the time the set switch 70 must be engaged before the microcontroller Z20 interprets the signal so created as a legitimate SET or TAP signal. This allows for the occurrence of a stray signal created by an accidental bump or mechanical jarring of the set switch 70. A legitimate SET or TAP signal will be longer than the debounce time of 22 msec., but less than the SETIME minimum of about 400 msec. as previously described with respect to block 534.

If the set switch 70 was depressed for greater than 22 msec., the method falls through to block 552 to check the condition of the BRKSET flag indicating whether the system is engaged or not. If BRKSET is clear, the method falls through to block 554 to check the vehicle speed to see whether it is greater than the set speed stored plus 2 miles per hour; if not, the system interprets this action of the operator as a TAP and proceeds to block 555 to set the ACLFLG flag and branches to block 556 to add 2 miles per hour to the stored set speed and to save this new value as a new set speed in memory Z51. Next, the method falls through to block 558 to load the vacuum timer, internal to microcontroller Z20, with 2 loop times or two 11 msec. pulses which is equal to 22 msec. Thereafter, the method branches to block 568.

Returning to block 552, if the BRKSET flag is set, the method will branch to block 559 to clear the BRKSET flag and then to block 560 to see whether the vehicle speed is greater than or equal to a variable called MINSET which is the minimum set speed allowed in order to use the electronic speed control system shown in FIG. 1. Block 559 is also entered via block 554 if the vehicle speed is found to be greater than the stored set speed plus 2 miles per hour.

In block 560, if the vehicle speed is less than the MINSET value, the method branches to block 561 to clear SETSPD and then to block 600. If the vehicle speed is greater than or equal to the MINSET value, the microcontroller Z20 interprets the action of the operator as a SET command and falls through to block 562 where the current vehicle speed is saved and defined as the new set speed. Next, in block 564, the method falls through to interpolate the variable SETPW and assign the SETPW variable with a set pulse of duration and multiples of 11 msec. counts. The interpolation is done via subroutine on data stored in memory Z51 as a look-up table. The look-up table is derived from a point slope curve similar to that shown in FIG. 14. The duration of the SETPW variable is a function of the set speed.

Next, the method falls through to block 568 to check the vehicle speed to see whether it is greater than a stored value MAXSET which is the maximum allowable set speed allowed for use by the electronic speed control system shown in FIG. 1. If the current set speed is greater than the MAXSET value, the method branches to block 566 to save the MAXSET as the new set speed. The output of blocks 566 and blocks 568 both are fed to block 570 to load the vac timer with the appropriate pulse as interpolated in block 564 or as specified in block 558. Thereafter, the method falls through to block 600.

Returning to block 550, if the set switch 70 was depressed for less than 22 msec., the method branches to block 600.

Referring now to block 600, the method checks to see whether a new vehicle speed exists. If not, as shown in block 602, the method branches to block 672 (to be explained below.) A new vehicle speed is found in block 600 by waiting for 11 loop times or 121 msec; for a new vehicle speed signal from speed sensor 78, then the information from the speed sensor 78 is processed. This is averaged with the old vehicle speed and then redefined as a new vehicle speed. This new vehicle speed is then used in block 604 to calculate the current acceleration. That is, if a new vehicle speed exists as checked in block 600, the method falls through to block 604 to calculate the current acceleration to be equal to $\frac{1}{8}$ of the difference between the variable's OLDSPD and NEWSPD. The calculated current acceleration employs as $\frac{1}{8}$ factor in the calculation. The $\frac{1}{8}$ factor represents $\frac{1}{8}$ sec. or 0.125 sec. which closely approximates 121 msec. or 11 loop times. The (NEWSPD-OLDSPD) is a difference in speed over 121 msec. Dividing by $\frac{1}{8}$ sec. closely approximates the correct acceleration in this period with the appropriate distance/time$^2$ units. the new acceleration is then averaged with the old in block 605 (reference: block 206).

Next, the method falls through to block 606 to check to see whether the speed control is engaged as indicated by the condition of the BRKSET flag. The significance of the BRKSET flag has been described above with respect to block 540.

Blocks 610 through 640 comprise the feature knon as CALERR. CALERR is a method of determining and using a filtered speed error in an integrated acceleration based electronic speed control system for vehicles.

Speed error is calculated by finding the difference between set speed and vehicle speed and then filtering the result. The error is tested for polarity and magnitude before selecting a desired acceleration rate.

If the electronic speed control is not engaged, the method branches to block 608 to load the vent timer with 15 counts. This corresponds to a vent pulse of 15 times 11 msec. in duration. Returning to block 606, if the speed control is found to be engaged, the method falls through to block 610 to calculate a variable called DELTASPEED. DELTASPEED is equal to the difference between the set speed value and the vehicle speed value. After this calculation, the method falls through to block 612 to check to see whether the DELTASPEED value calculated in block 610 is positive.

If the DELTASPEED is positive as checked in block 612, i.e., the set speed is greater than the vehicle speed, the method branches to block 614 to determine whether the system is in a resume or a tap mode. This is done by checking the condition of the flag ACLFLG. If ACLFLG equals zero, the system is not in a resume or tap mode and the method branches to block 616 to interpolate the variable VACREG from a table of values taken from a point-slope curve as shown in FIG. 17 to retrieve (as donein previous interpolations) the desired acceleration value from memory Z51 which is positive. The variable VACREG is the REGULAR DESIRED ACCELERATION CURVE. This is to be distinguished from the variable VACACC which is the DESIRED ACCELERATION CURVE or talbe of values taken from the curve in FIG. 16 for the RESUME/TAP mode. Basically, these curves are a table of values stored in memory Z51 which the system uses to look up the values needed for a smooth return to the set speed or, more specificaly, how much acceleration is needed to return to the set speed by controlling the vacuum solenoid 34. The data in the VACACC table provides faster acceleration than the VACREG table.

Following block 616, the method branches down to other parts of the routine using VACREG, the desired acceleration (positive) from block 616 to compute the acceleration error.

Returning now to block 614, by monitoring the flag ACCFLG, if the system determines that the operator of the vehicle has called for a resume or a tap, the system falls through to block 618 to compare the variable DELTASPEED with the variable ACLRST. The comparison is made by checking to see whether the variable DELTASPEED is greater than or equal to a variable ACLRST. The ACLRST is a variable which is the DELTASPEED required to reset an acceleration flag ACLFLG; this indicates the end of a resume or tap mode.

If the DELTASPEED is greater than or equal to ACLRST as checked in block 618, the method branches to block 620 to interpolate the variable VACACC as previously described with respect to block 616. Alternatively, if the DELTASPEED variable is less than the constant ACLRST, the method falls to block 619 to cancel RESUME/TAP mode by clearing the ACLFLG flag—and then falls through to block 620 to interpolate the variable VACACC, described above, to retrieve the desired acceleration value, which is positive, before proceeding to fall through to other blocks on the routine using VACACC to compute the acceleration error.

Returning again to block 612, if the DELTASPEED is not positive, the method, in block 628, takes the absolute value, makes the delta positive, then clears ACCFLG in block 629, cancelling the RESUME/TAP MODE, the method falls to block 630 to again interrogate the DELTASPEED variable to see whether it is greater than a constant VNTAB1 is a limit to the maximum overspeed error allowed before the vent time is 100 percent (continuous venting).

If the DELTASPEED is less than or equal to the constant VNTAB1, the method falls through to block 632 to again interrogate the variable DELTASPEED to see whether it is greater than the constant VNTAB2. The constant VNTAB2 is an overspeed limit corresponding to ½ the maximum vent time allowed by the system. VNTAB1 and VNTAB2 are limits that, when triggered, will close the throttle as rapidly as possible; both are stored in memory Z51.

If the now positive DELTASPEED variable is less than or equal to the constant VNTAB2, the method falls through to block 634 to interpolate the point slope curve in FIG. 18 for the variable VENTRG, the regular desired acceleration rate for the vent solenoid 36 to retrieve the desired acceleration value which is negative. (This can also be done in a look-up table.)

After the variable VENTRG is interpolated and the desired deceleration value is retrieved from memory Z51, the method falls through to other blocks in the program which will be described below, but essentially the outputs from the steps performed in blocks 616, 620 and 634 all fall through to block 640 having captured the desired acceleration to compute the acceleration error.

Returning to block 630 and 632, if the DELTASPEED variable is less than the constant VNTAB1 as checked in block 630, and if the DELTASPEED variable is greater than the constant VNTAB2 as checked in block 632, the method moves to close the throttle (at a 50 percent rate in block 636.). If the method branches from block 630 shown that the DELTASPEED variable is greater than the constant VNTAB1, the method branches to block 608 to load the vent timer (internal to the microcontroller Z20) with a 15 times 11-msec. continuous vent period. Similarly, if the method moves to close the throttle from block 632, the branch is to block 636 and the vent timer is loaded with a 5 times 11-msec. continuous time period resulting in a 55 msec. vent time. From block 608 or 636, the method falls through to block 672 which will be described below.

Blocks 642 through 666, including the branch throught to block 662, comprise the feature known as ERRCHK. ERRCHK is a method for determining and using an acceleration correction in an integrated acceleration based electronic speed control system for vehicles.

An error correction pulse is selected by integrating (or summing) the differences between desired acceleration and the actual vehicle acceleration. The integral is compared to a trigger window. The throttle position is controlled based on the value of the integral as compared to the window. This is key in providing smooth control. The integration action serves to filter transient acceleration errors and to dampen throttle response to prevent throttle correction at a faster rate than the vehicle can respond thereby reduing over and under shoot of the throttle.

Returning now to the point in the method which follows the interpolation of the variables VENTRG, VACREG or VACACC, the method finds itself in block 640 subtracting the actual acceleration from the desired acceleration to compute an acceleration error. The acceleration error term computed in block 640 is added to a sum register in block 642 and is now called the summed acceleration error (ACCEL ERROR). The method next, in block 644, saves the sign of the sum register in memory and next, in block 646, interpolates the variable THGAIN which is the variable for the throttle gain factor. The throttle gain factor THGAIN is basically a dampening curve and it is stored in memory from a table or from a curve as shown in FIG. 19. It is a linear interpolation table in memory Z51 of the desired gain for throttle respone as mapped against DELTA THROTTLE throttle positon minus the MINIMUM THROTTLE position; THR-MINTHR.

MINTHR represents the lowest and MAXTHR represents the highest observed throttle and is completely descibed in commonly owned U.S. Pat. No. 4,637,361 issued on Jan. 20, 1987 to Killen et al., which has been expressly incorporated by reference.

The method next falls through to block 648 to interpolate the variable SPGAIN (from a table or from a curve as shown in FIG. 20), the speed gain factor used in combination with the throttle gain factor THGAIN to form a sum which is called SCGAIN, which is the speed control gain factor for the entire system. The computation of the total gain for the speed control system is done in block 650 and is called SCGAIN.

Next, the system moves to block 652 to retrieve the absolute value of the sum register in microcontroller Z20 which is holding the summed acceleration error.

Next, the method moves to block 654 to look at the absolute value of the summed acceleration error and see whether it is greater than or equal to the total gain for the speed control system, SCGAIN. This is done in block 654. If the absolute value of the summed acceleraton error is greater than or equal to SCGAIN, the method falls through to block 656 to clear the sum ACCEL ERROR register and then to look at the sign of the sum ACCEL ERROR register in block 658 which was saved in block 644. If the sign of the sum register is positive, the method continues to fall through to block 660 to check to see whether the actual throttle position is greater than or equal to the maximum allowable throttle position value MAXTHR. If so, the method branches to block 672 and no vacuum action will be called for. If not, a vacuum pulse is loaded into the vacuum timer which corresponds to an 11 msec. pulse; this is done in block 662. Returning to block 658, if the sign of the sum register is not positive, the method branches the block 664 to check the actual throttle position value and compare it to the constant CLOTHR which is a constant which prevents the vent action if the actual throttle position is less than the stored constant CLOTHR. If the throttle position is greater than or equal to the variable CLOTHR, the method falls through to block 666, loading the vent timer with two 11-msec. time periods resulting in a 22 msec. vent pulse. Next, the method falls through to block 672. Returning to block 664, if the throttle position is less than the variable CLOTHR, the method automatically falls through to block 672 and no vent action is called for.

Returning now to block 654, if the absolute value of the summed acceleration error in the sum register is less than the total gain of the speed control system SCGAIN, the method branches to block 668 to hold the pulse by saving the sum register in block 668 and then by clearing the vacuum and vent timers in block 670 and falling through to block 672.

In block 672, the vacuum timer is checked to see whether its value is equal to zero. If it is, the method in block 674 then checks the vent time to see whether it is equal to zero. If so, the method falls through in block 676 to set bit 0 (5) equal to a logical one setting and to set bit 7 to a logical zero in RPIDRA, a specific location in the memory Z51 shown in FIG. 1 causing the throttle to hold its current position. These bits are the control signals for the solenoid driver circuits; a logical "0" turn on the driver which allows current to flow and a logical "1" turns the driver off. This should not be confused with the truth table information in FIG. 2 which merely described the overall throttle action vis-a-vis the solenoid action.

Once the output is sent to the memory Z51 in block 676, the method returns to the main control strategy in the engine control logic module 50 in block 686.

Returning to block 672, if the vacuum timer is not equal to zero, the method branches to block 678 to decrement the vacuum timer and output in block 680, a signal to the same memory Z51 locatin RPIDRA only this time placing a logicl zero in bit 0 and a logicl zero in bit 7 causing the throttle to open for the vacuum timer period before falling through to return to the main control strategy in block 686.

Returning to block 674, if the vent timer is not equal to zero, the method branches to decrement the vent timer in block 682 and in block 684 outputs a logical one to bit location 0 and a logical one to bit location 7 in the memory Z51 location in RPIDRA causing the throttle to close for the vent timer period before falling through to block 686 and returning to the main control strategy.

The bit patten of RPIDRA the solenoid drive register, is communicated to the throttle actuator vacuum servo's vent and vacuum solenoids in the main engine control program every 11 msec in the diagnostic routine as described in the commonly assigned Kissel patent '638. This technique allows for standard engine control diagnostics techniques to be performed on these solenods and other solenoids.

Figure 21:
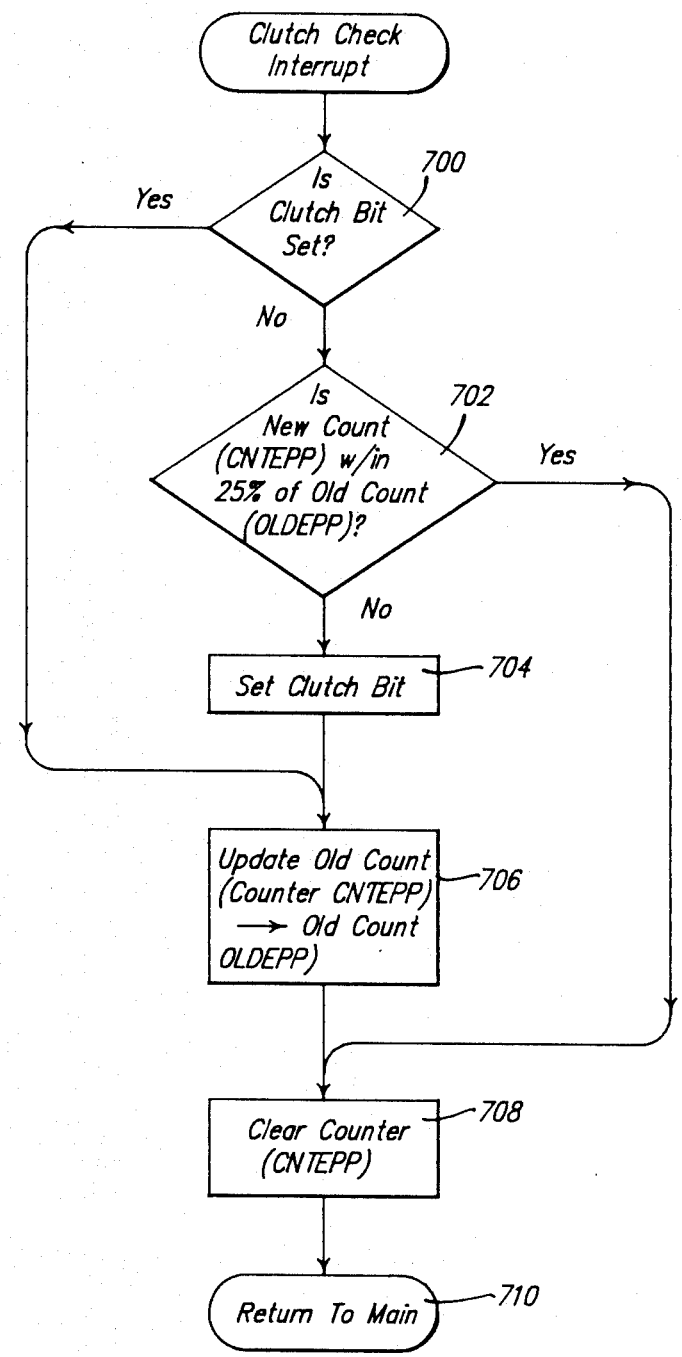
FIG. 21 is a flowchart illustrating the method for checking the condition of the clutch for an electronic speed control.

Presented in FIG. 21 is a method of determining the condition of a manual transmission clutch and of a park/neutral gear in an automatic transmission in an electronic speed control system for a vehicle.

A method is shown to disengage an electronic speed control as a function of the condition of the park/neutral gear or manual clutch. If the automatic transmission lever is bumped from "drive" or the manual transmission clutch is disengaged (by depression of the clutch pedal or by putting the transmission in neutral) while the electronic speed control is operating, the method will sense this by detecting a difference in the ratio of engine speed to vehicle speed (N/V). If the ratio changes by ±25 percent, the electronic speed control is disengaged.

Referring now to FIG. 21, the clutch check subroutine will be described. The clutch check routine is executed every eighth pulse from the speed sensor 78 on vehicles utilizing a manual transmission. In this regard, eight pulses from the speed sensor 78, in this particular embodiment, is equivalent to one revolution of the speed sensor. A signal generated by another sensor (an engine speed sensor) on the engine (not shown) creates a pulse called an engine pick-up pulse, where the frequency of the engine pick-up pulse signal is equal to the engine RPM divided by 30 for a four-cylinder engine. A counter is set up internal to microcontroller Z20 and is called CNTEPP, which is incremented for every engine pick-up pulse as it occurs.

Returning now to the description of the clutch check by the subroutine, the clutch bit in a designated data word is cleared after a set condition or a resume condition; therefore, there are three main memory locations in memory Z51 which are utilized in this subroutine. CNTEPP corresponds to the number of counts from the engine pick-up pulse per speed sensor revolution. This memory location stores the count from a counter internal to the microcontroller Z20 and this counter is incremented for each engine pick-up pulse as it occurs. Another memory location, OLDEPP, corresponds to the value of CNTEPP which existed at or upon the occurrence of a set or a resume condition. Another memory location called CLCHMK corresponds to the clutch bit. If CLCHMK is set, then the speed control should be in off condition.

Returning to block 700 in the clutch check subroutine as branched to on an interrupt basis as described above from the main electronic speed control method, if the clutch bit CLCHMK is not set, the method falls through to block 702 to check to see if the engine pick-up pulse count per speed sensor revolution is currently within 25 percent of the OLDEPP count. This is a window of acceptable counts which, if exceeded, will indicate in general that the N/V ratio has changed. If the count in CNTEPP is within 25 percent of the OL- DEPP count, the method will branch to block 708 to clear the CNTEPP counter to start as a new speed sensor revolution and return to the main control strategy in block 710 as no change has occurred from engagement of the clutch to upset the control of the engine from the electronic speed control.

Returning now to block 702, if the new count in memory location CNTEPP is not within the 25 percent window of the old count in OLDEPP, the method falls through to block 704 to set the clutch bit CLCHMK indicating that the clutch has been engaged as a significant (±25 percent) change in the N/V ratio usually indicating a changed gear condition. The method then falls through to block 706 to update the old count OLDEPP by reading the contents of the CNTEPP into the OLDEPP location. This block 706 is also entered if the clutch bit has been set as checked by block 700. The method next falls through to block 708 and 710 as previously described to return to the main program after clearing the counter CNTEPP to start another speed sensor revolution. The subroutine returns to the main program to block 510 carrying its decision to be used in the rest of the electronic speed control strategy.

Such a method can also be used by computing and monitoring the rate of change of engine speed or the ratio of vehicle speed to engine speed.

Figure 22:
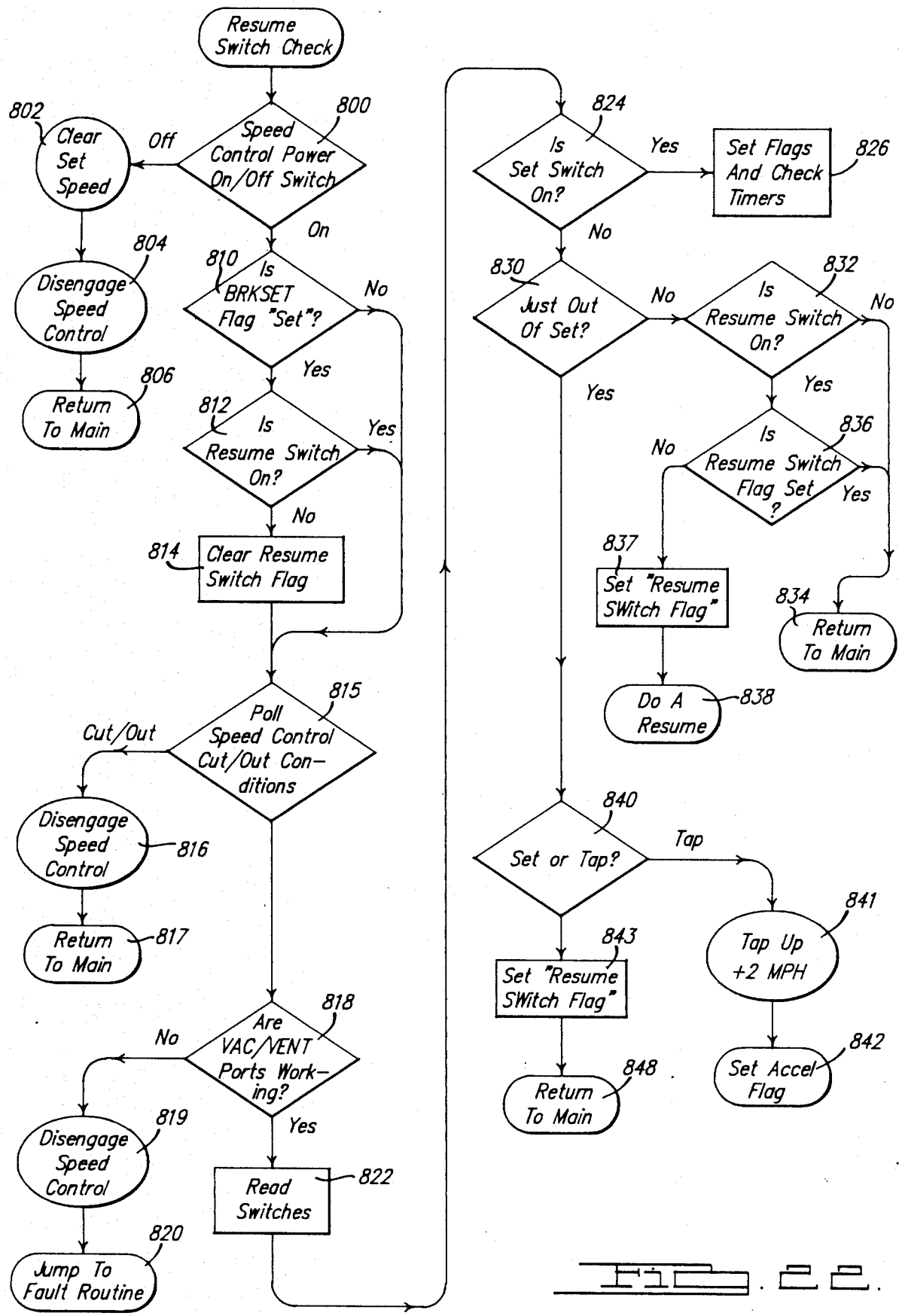
FIG. 22 is a flowchart illustrating the method for checking the resume switch and disabling it, if necessary.

Presented in FIG. 22 is a method of disabling a resume switch in an electronic speed control system for vehicles.

A decision is made to disable the resume switch if it is found in an engage condition at the same time that normal electronic speed control cut-outs are in effect due to conditions such as: brake on, car speed too low, park/neutral gear engaged (automatic transmission), clutch engaged (manual transmission), RPM too high, or N/V (the ratio of engine speed N to vehicle speed V) is out of range.

Referring now to FIG. 22, the resume switch check routine is described. Looking first at decision block 800 which is reached by a branch from the main electronic speed control routine described in this description as it relates to block 110 and block 502, the method calls for the polling of the speed control power on/off switch shown in fIG. 1 as item 74. If the on/off switch 74 is in the off condition, the method branches to block 802 to clear the set speed before branching back to the main electronic speed control routine from block 804 to disengage the speed control as shown in block 120 and block 540 and eturn to the main electronic speed control routine in block 806.

If the speed control on/off switch 74A is in the on condition as checked in block 800, the BRKSET flag is polled in block 810 to determine its condition. If the BRKSET flag is in the set condition, the method falls through to block 812 to make another decision based on the condition of the resume switch shown as item 72 in FIG. 1. If the resume switch 72 is off, the method falls through to block 814 to clear the resume switch flag (RESSW). Clearing the RESSW flag allows the Resume mode to be enabled. This now means the operator can do a resume if desired. Alternatively, if the BRKSET flag is clear as checked in block 810, a resume is not allowed due to the branch to block 815. This means that the resume mode cannot be re-armed until after the speed control is disengaged. This method will detect and react to stuck resume switch conditions, even those due to an oscillating resume switch signal. These steps are expanded explanations of what occurs in blocks 130, 131, and 503. Next, the speed control cut-out conditions are polled in block 815.

Returning now to decision block 810, if the BRKSET flag is in the clear condition, the method branches directly from block 810 to block 815 to check the speed control cut-out conditions. The speed control cut-out conditions include conditions such as the vehicle brake being applied, the vehicle speed being too low, the park or neutral gear being engaged in vehicles equipped with automatic transmissions, the clutch being engaged for vehicles equipped with manual transmissions, the engine RPM being too high, or the ratio of the engine speed to the vehicle speed being out of range. This is also addressed in blocks 133, 134, 135, 504, 506, 508, 510 and 512.

If any of the cut-out conditions are out of range indicating that the speed control system should be disengaged, the method branches to block 816 to disengage the speed control (reference: block 120 and 540), before returning to the main electronic speed control routine in block 817.

If none of the speed control cut-out conditions are met as checked in block 815, the method falls through to block 818 to check the vac/vent ports; if not working, the method disengages the speed control in block 819 and jumps to a fault routine in block 820. This is also shown in reference to blocks 139 and 514. If the vac/vent ports are working from block 818, the switches are read (the condition of the set switch 70 and the resume switch 72). Reference: blocks 150 and following and blocks 530 and following.

Next, the routine in block 824 polls the condition of the set switch 70. If the set switch is on, the method branches to block 826 to set the appropriate flags and to check the timers as described elsewhere in this description; see blocks 532 and following.

Returning now to block 824, if the set switch 70 is off, the method falls through to block 830 to check to see if the electronic speed control has just been set; reference: block 548. If the electronic speed control has not just been set, the method branches to block 832 to poll the condition of the resume switch 72; reference: block 582. If the resume switch 72 is off, the method branches to block 834 to return to the main electronic speed control routine; reference blocks 203 and 600.

Returning now to block 832, if the resume switch 72 is on, the method falls through to block 836 to poll the condition of the resume switch flag. If the resume switch flag is set, the method branches, as previously described, to block 834 to return to the main routine. If the resume switch flag is clear as checked in block 836 (reference: block 584), the method falls through to to set the resume switch flag in block 837 and then to block 838 to enter the resume mode of the electronic speed control routine (reference: block 190 and 588).

Returning now to decision block 830, if the electronic speed control has just recently been set, but the set switch 70 is off, the method will fall through to block 840 to determine whether the condition should be interpreted as a set or a tap. (See blocks 550, 552, 554.) If the routine interprets the condition as a tap, this routine is followed via block 842 and the set speed is increased by two miles per hour (reference: blocks 170 and 554).

Returning now to block 840, if the set condition is found as checked in block 840, the method falls through to set the resume switch flag in block 843 and then to block 844 to perform a set function on the current speed the vehicle is traveling (reference: blocks 150 and 560).

Next, the method returns to the main electronic speed control routine in block 848 (reference: block 562).

The resume switch flag is set after a set or a resume condition in the normal speed control mode. The resume switch is not recognized when the resume switch flag is in the set condition.

While the present invention has been disclosed in connection with the preferred embodiment thereof, it should be understood that there may be other embodiments which fall within the spirit and scope of the subject invention and that the invention is susceptible to modification, variation and change without departing from the proper scope or the fair meaning of the following claims.

I claim:

1. In a method for use in an electronic speed control, the method for determining and using a filtered speed error in an acceleration based electronic speed control system for a vehicle with an internal combustion engine with a throttle, a throttle position indicator, and a vacuum source where the electronic speed control system includes: a vacuum actuator, a vacuum reservoir and a valve body with a vacuum solenoid, a vent solenoid and a purge vent solenoid to work with a voltage source and switches and sensors including a set switch, resume switch, power on/orr switch, park/neutral or clutch switch, a speed sensor, and a brake switch; signal conditioning; a memory for storing data including point slope curves and look-up tables; an A/D converter; a vacuum solenoid driver and interface; a vent solenoid driver and interface and a microcontroller with input/output ports hereafter called vac/vent ports, to communicate with the valve body, where one of the uses for the microcontroller is for processing signals generated by the voltage source and switches and sensors which represent various speed control conditions as selected by the operator of the vehicle;
a method of determining and using a filtered speed error in an acceleration based electronic speed control system comprising:
monitoring a set speed selected by an operator of the vehicle;
monitoring the vehicle speed;
computing a speed error by finding the difference between set speed and the vehicle speed;
calculating a desired acceleration from point slope curves stored in memory based on the computed speed error;
monitoring the actual acceleration;
computing an acceleration error based on the difference between the desired acceleration and the actual acceleration;
using the acceleration error to drive the vehicle speed to the set speed and reducing the speed error to zero.

2. The method of determining and using a filtered speed error from claim 1 where the desired acceleration is interpolated from look-up tables stored in memory.

3. The method of determining and using a filtered speed error in an acceleration based electronic speed control of claim 1 where the desired acceleration is interpolated from stored data, the stored data being preselected for regular speed control conditions and for tap/resume speed control conditions, the stored data for tap/resume conditions providing faster acceleration data than the stored data for the regular speed control conditions.

* * * * *